US012632139B2

(12) United States Patent
Kim

(10) Patent No.: US 12,632,139 B2
(45) Date of Patent: May 19, 2026

(54) TOUCH DETECTION DEVICE INCLUDING DETECTING INTEGRATED CIRCUITS AND DISPLAY DEVICE INCLUDING THE SAME

(71) Applicant: SAMSUNG DISPLAY CO., LTD., Yongin-si (KR)

(72) Inventor: Jung Hak Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/065,438

(22) Filed: Feb. 27, 2025

(65) Prior Publication Data

US 2025/0224829 A1      Jul. 10, 2025

Related U.S. Application Data

(62) Division of application No. 18/364,834, filed on Aug. 3, 2023, now Pat. No. 12,265,672.

(30) Foreign Application Priority Data

Dec. 14, 2022      (KR) ........................ 10-2022-0174834

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/04166* (2019.05); *G06F 3/0446* (2019.05); *G06F 2203/04111* (2013.01)

(58) Field of Classification Search
CPC ............... G06F 3/04164; G06F 3/0412; G06F 3/04166; G06F 3/0446; G06F 2203/04111; G06F 3/0443; G06F 3/0416; G06F 3/046
See application file for complete search history.

(56) References Cited

U.S. PATENT DOCUMENTS

| | | | |
|---|---|---|---|
| 8,810,543 B1 | 8/2014 | Kurikaw | |
| 9,323,381 B2 | 4/2016 | Lim | |
| 10,664,085 B2 | 5/2020 | Kakinoki et al. | |
| 11,086,443 B1 * | 8/2021 | Chang ................. | G06F 3/04164 |
| 11,231,768 B1 | 1/2022 | Cheng | |
| 2011/0148435 A1 | 6/2011 | Schwartz et al. | |
| 2011/0242015 A1 | 10/2011 | Lou | |

(Continued)

FOREIGN PATENT DOCUMENTS

KR      10-2013-0134016      12/2013

*Primary Examiner* — Rodney Amadiz
(74) *Attorney, Agent, or Firm* — F. CHAU & ASSOCIATES, LLC

(57) ABSTRACT

A touch detection device may include a touch area including a plurality of driving electrodes and a plurality of detecting electrodes, a plurality of touch driving integrated circuits (ICs) electrically connected to and supplying driving signals to the driving electrodes, a plurality of touch detecting ICs electrically connected to the detecting electrodes and receiving touch detection signals from the detecting electrodes, and a touch control IC controlling the touch driving ICs and the touch detecting ICs. The touch area may be divided into a plurality of sub-touch areas, the touch driving ICs may be provided to correspond to the plurality of sub-touch areas, respectively, in a one-to-one manner, and the plurality of touch detecting ICs may be provided to correspond to the sub-touch areas, respectively.

3 Claims, 21 Drawing Sheets

TSA : TSA1, TSA2, TSA3, TSA4

(56)             References Cited

U.S. PATENT DOCUMENTS

| | | |
|---|---|---|
| 2012/0319966 A1 | 12/2012 | Reynolds |
| 2013/0257798 A1 | 10/2013 | Tamura et al. |
| 2014/0054151 A1 | 2/2014 | Wu |
| 2014/0253498 A1 | 9/2014 | Suzuki et al. |
| 2014/0362042 A1 | 12/2014 | Noguchi et al. |
| 2015/0077370 A1 | 3/2015 | Kim et al. |
| 2015/0268779 A1 | 9/2015 | Yang et al. |
| 2016/0154499 A1 | 6/2016 | Bae et al. |
| 2017/0357353 A1 | 12/2017 | Katsuta |
| 2018/0039367 A1 | 2/2018 | Suzuki et al. |
| 2018/0113346 A1* | 4/2018 | Han .................. G06F 3/041661 |
| 2019/0102008 A1 | 4/2019 | Takada et al. |
| 2019/0227657 A1* | 7/2019 | Shimizu .............. G06F 3/04166 |
| 2020/0097112 A1 | 3/2020 | Seo et al. |
| 2021/0072580 A1 | 3/2021 | Ahn |
| 2024/0028156 A1 | 1/2024 | Dai |
| 2024/0201811 A1 | 6/2024 | Kim |

* cited by examiner

DU : SUB, TFTL, EML, TFEL

TSA : TSA1, TSA2, TSA3, TSA4

TSA : TSA1, TSA2, TSA3, TSA4

TSA : TSA1, TSA2, TSA3, TSA4
TPA : TPA1, TPA2, TPA3, TPA4

TSA : TSA1, TSA2, TSA3, TSA4
TPA : TPA1. TPA2. TPA3. TPA4

START

CONTROL A PLURALITY OF TOUCH DRIVING ICS TO SUPPLY DRIVING SIGNALS FOR EACH TOUCH AREA BY PROCESSOR ～1710

CONTROL A PLURALITY OF TOUCH DETECTING ICS TO RECEIVE TOUCH SIGNALS GENERATED FOR EACH TOUCH AREA BY PROCESSOR ～1720

CALCULATE TOUCH DATA BY DIGITALLY PROCESSING TOUCH SIGNALS RECEIVED FROM A PLURALITY OF DETECTING ICS BY PROCESSOR ～1730

END

TOUCH DETECTION DEVICE INCLUDING DETECTING INTEGRATED CIRCUITS AND DISPLAY DEVICE INCLUDING THE SAME

CROSS-REFERENCE TO RELATED APPLICATIONS

This application is a divisional of U.S. patent application Ser. No. 18/364,834 filed on Aug. 3, 2023, which claims priority to Korean Patent Application No. 10-2022-0174834, filed on Dec. 14, 2022, in the Korean Intellectual Property Office, and all the benefits accruing therefrom under 35 U.S.C. 119, the contents of which in their entireties are herein incorporated by reference.

BACKGROUND

1. Field of the Disclosure

One or more embodiments described herein relate to a touch detection device and a display device including the same.

2. Description of the Related Art

A variety of display devices have been developed. Examples include flat panel display devices such as liquid crystal display devices, field emission display devices, and organic light emitting display devices. Among these, a light emitting display device may display an image without using a backlight unit providing light to a display panel. This is because each of pixels of the display panel includes light emitting elements that emit light by themselves.

Some display devices include a touch detection device that recognizes a touch input. The touch detection device may be configured to decide whether or not a user's touch input has occurred and to calculate an area in which the touch input is detected (e.g., touch input coordinates). This may be accomplished using, for example, capacitance-type touch sensors.

SUMMARY

One or more embodiments described herein provide a touch detection device capable of facilitating the implementation and design of integrated chips (ICs) for driving touch sensors included in a display device. The display device may have a variety of sizes, but may be especially suitable for use in relative large size display devices. These or other embodiments may reduce manufacturing costs. Additional embodiments include a display device which includes the aforementioned touch detection device.

According to an embodiment of the present disclosure, a touch detection device may include a touch area including a plurality of driving electrodes and a plurality of detecting electrodes crossing the plurality of driving electrodes, a plurality of touch driving integrated circuits (ICs) electrically connected to the plurality of driving electrodes and configured to supply driving signals to the plurality of driving electrodes, a plurality of touch detecting ICs electrically connected to the plurality of detecting electrodes and configured to receive touch detection signals from the plurality of detecting electrodes, and a touch control IC controlling the plurality of touch driving ICs and the plurality of touch detecting ICs. The touch area may be divided into a plurality of sub-touch areas, the plurality of touch driving ICs may be provided to correspond to the plurality of sub-touch areas, respectively, in a one-to-one manner, and the plurality of touch detecting ICs may be provided to correspond to the plurality of sub-touch areas, respectively, in a one-to-one manner.

The touch control IC may be provided as a single driving chip.

The plurality of touch driving ICs and the plurality of touch detecting ICs may be mounted on a substrate on which the plurality of driving electrodes and the plurality of detecting electrodes may be formed.

The touch control IC may be mounted on a circuit board electrically connected to the substrate.

Each of the touch driving ICs and each of the touch detecting ICs may be mounted in a touch peripheral area disposed adjacent to each of the sub-touch areas.

The plurality of touch driving ICs and the plurality of touch detecting ICs may be mounted on sub-circuit boards electrically connected to a substrate on which the plurality of driving electrodes and the plurality of detecting electrodes may be formed.

The touch control IC may be mounted on a main circuit board electrically connected to the sub-circuit boards.

The touch area may include a first sub-touch area, a second sub-touch area disposed in a first direction from the first sub-touch area, and a third sub-touch area disposed in the first direction from the second sub-touch area, the second sub-touch area may be disposed between the first sub-touch area and the third sub-touch area, areas of the first to third sub-touch areas may be all the same as each other, and the plurality of touch driving ICs and the plurality of touch detecting ICs may be mounted on touch peripheral areas positioned in a second direction perpendicular to the first direction from the first to third sub-touch areas.

The touch detection device may further include switching units disposed between the first to third sub-touch areas, and the plurality of touch driving ICs and the plurality of touch detecting ICs. The switching units include a plurality of first switching elements (or switches) switching electrical connections between a plurality of channels connected to the driving electrodes or the detecting electrodes of the first to third sub-touch areas and the plurality of touch driving ICs based on first control signals, and a plurality of second switching elements (or switches) switching electrical connections between the plurality of channels and the plurality of touch detecting ICs based on second control signals.

The touch control IC may be set to activate the first control signals and the second control signals alternately.

According to an embodiment of the present disclosure, a display device may include a display panel, and a touch detection device including a touch area overlapping at least a portion of the display panel. The touch detection device may include the touch area including a plurality of driving electrodes and a plurality of detecting electrodes crossing the plurality of driving electrodes, a plurality of touch driving ICs electrically connected to the plurality of driving electrodes and configured to supply driving signals to the plurality of driving electrodes, a plurality of touch detecting ICs electrically connected to the plurality of detecting electrodes and configured to receive touch detection signals from the plurality of detecting electrodes, and a touch control IC controlling the plurality of touch driving ICs and the plurality of touch detecting ICs, the touch area may be divided into a plurality of sub-touch areas, the plurality of touch driving ICs may be provided to correspond to the plurality of sub-touch areas, respectively, in a one-to-one manner, and the plurality of touch detecting ICs may be provided to correspond to the plurality of sub-touch areas, respectively, in a one-to-one manner.

The touch control IC may be provided as a single driving chip.

The plurality of touch driving ICs and the plurality of touch detecting ICs may be mounted on a substrate on which the display panel may be formed.

The touch control IC may be mounted on a circuit board electrically connected to the substrate.

Each of the touch driving ICs and each of the touch detecting ICs may be mounted in a touch peripheral area disposed adjacent to each of the sub-touch areas.

The plurality of touch driving ICs and the plurality of touch detecting ICs may be mounted on sub-circuit boards electrically connected to a substrate on which the display panel may be formed.

The touch control IC may be mounted on a main circuit board electrically connected to the sub-circuit boards.

The touch area may include a first sub-touch area, a second sub-touch area disposed in a first direction from the first sub-touch area, and a third sub-touch area disposed in the first direction from the second sub-touch area, the second sub-touch area may be disposed between the first sub-touch area and the third sub-touch area, areas of the first to third sub-touch areas may be all the same as each other, and the plurality of touch driving ICs and the plurality of touch detecting ICs may be mounted on touch peripheral areas positioned in a second direction perpendicular to the first direction from the first to third sub-touch areas.

The touch detection device may further include switching units disposed between the first to third sub-touch areas, and the plurality of touch driving ICs and the plurality of touch detecting ICs, and the switching units include a plurality of first switching elements (or switches) switching electrical connections between a plurality of channels connected to the driving electrodes or the detecting electrodes of the first to third sub-touch areas and the plurality of touch driving ICs based on first control signals, and a plurality of second switching elements (or switches) switching electrical connections between the plurality of channels and the plurality of touch detecting ICs based on second control signals.

The touch control IC may be set to activate the first control signals and the second control signals alternately.

In accordance with one or more embodiments, a display device includes a plurality of detecting integrated circuits (ICs) coupled to a respective plurality of sub-touch areas; and a processor configured to determine that a touch input has occurred on one of the sub-touch areas, wherein: each of the plurality of detecting ICs is configured to output an analog touch signal generated by a first electrode of a corresponding one of the sub-touch areas, and the processor is configured to: convert the analog touch signal generated from each of the sub-touch areas to digital touch sensing data, and determine that touch input has occurred based on the digital touch sensing data.

The processor may be configured to generate touch identification data from the digital touch sensing data generated for each of the sub-touch areas, calculate touch data based on a combination of the touch identification data generated for the plurality of sub-touch areas, and determine that touch input has occurred based on the touch data.

The display device may further comprise a plurality of driving ICs, each of the plurality of driving ICs configured to drive a second electrode in a respective one of the sub-touch areas, wherein the processor is configured to control driving timings of the plurality of driving ICs.

With a touch detection device and a display device including the same according to exemplary embodiments, it is possible to facilitate implementation and design of integrated chips (ICs) for driving touch sensors included in a display device having a large size and reduce a manufacturing cost.

In addition, when touch sensors are applied to a display device having an aspect ratio of a screen different from that of a general TV or monitor, such as a display device applied to a vehicle, ICs may be designed to correspond to a ratio of the number of channels of the touch sensors, such that design loss of the ICs may be reduced.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
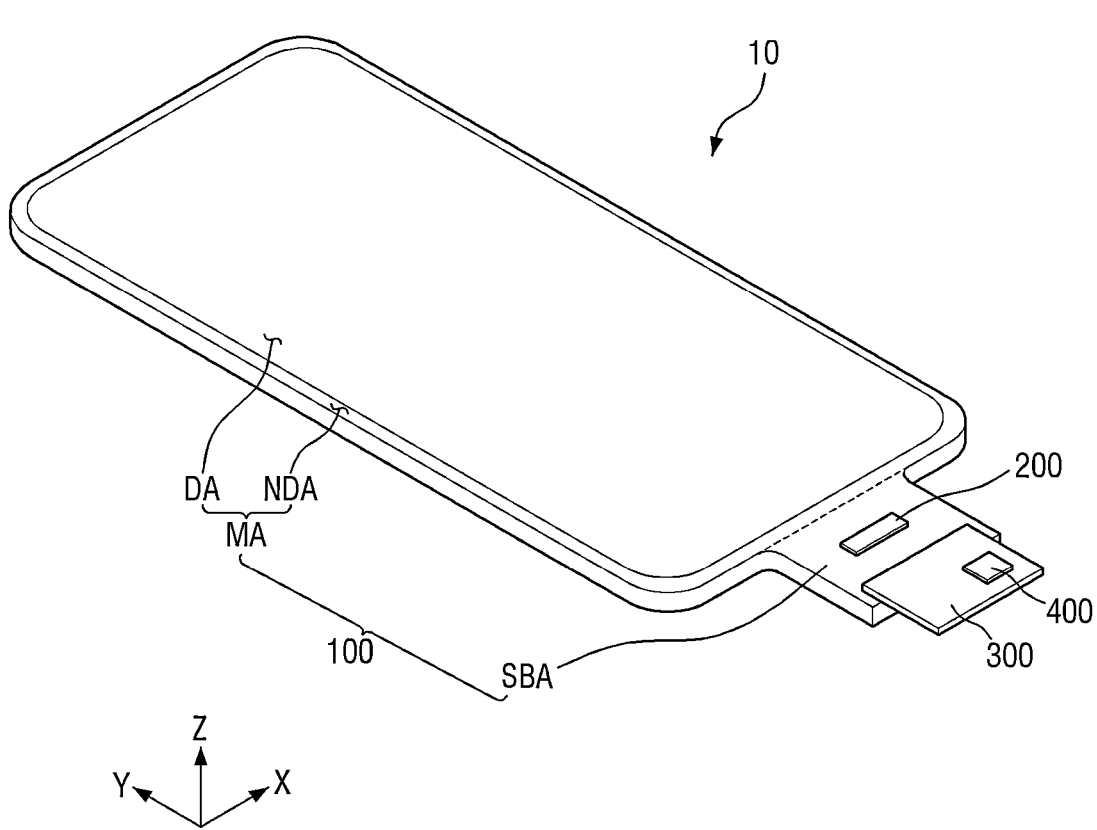
FIG. 1 is a schematic perspective view of a display device according to an exemplary embodiment.
Figure 2:
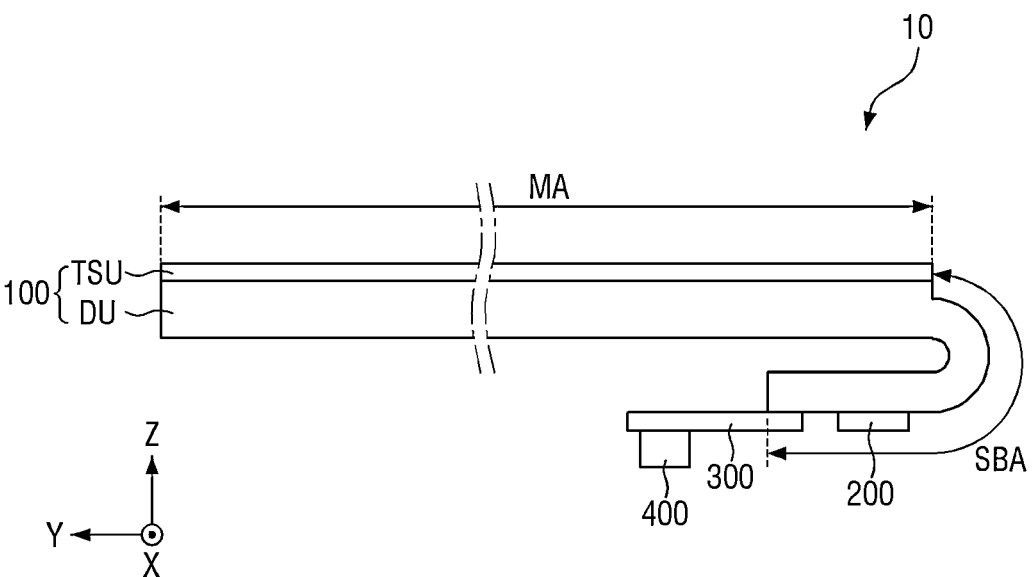
FIG. 2 is a schematic cross-sectional view of the display device according to an exemplary embodiment.

FIG. 1 is a schematic perspective view of a display device 10 according to an embodiment. FIG. 2 is a schematic cross-sectional view of the display device according to an exemplary embodiment.

In the drawings, a first direction X is parallel to one side of the display device 10 in a plan view, and may refer to a short side direction of the display device 10. A second direction Y is parallel to the other side of the display device and is in contact with the one side of the display device 10 in a plan view. The second direction Y may therefore refer to a long side direction of the display device 10. A third direction Z refers to a thickness direction of the display device 10. However, it is to be understood that directions mentioned in exemplary embodiments refer to relative directions, and exemplary embodiments are not limited to the mentioned directions.

The display device 10 may include various electronic devices that provide display screens. For example, the display device 10 may be applied to portable electronic devices such as, but not limited to, mobile phones, smartphones, tablet personal computers (PCs), mobile communication terminals, electronic notebooks, electronic books, portable multimedia players (PMPs), navigation devices, and ultra mobile PCs (UMPCs). The display device 10 may also be applied as a display unit DU of televisions, laptop computers, monitors, billboards, or the Internet of Things (IOTs). In addition, the display device 10 may be applied to wearable devices such as smart watches, watch phones, glasses-type displays, and head mounted displays (HMDs).

Referring to FIG. 1, the display device 10 may have a predetermined shape, e.g., a shape similar to a rectangular shape in a plan view. For example, the display device 10 may have a shape similar to a rectangular shape, in a plan view, having short sides in the first direction X and long sides in the second direction Y. In some embodiments, a corner where the short side in the first direction X and the long side in the second direction Y meet may be rounded with a predetermined curvature or right-angled. The shape of the display device 10 in plan view is not limited to the rectangular shape, and may be a shape similar to other polygonal shapes, a circular shape, an elliptical shape, or another shape.

At least one of a front surface or a rear surface of the display device 10 may be a display surface. In one embodiment, the "front surface" may be understood as a surface positioned on one side of one plane, and may refer to a surface positioned in the third direction Z in the drawings. The "rear surface" may be understood as a surface positioned on the other side of one plane, and may refer to a surface positioned in a direction opposite to the third direction Z in the drawings. In some embodiments, the display device 10 may be a double-sided display device 10 in which display is performed on both the front surface and the rear surface, but an exemplary embodiment in which the display surface is positioned on the front surface of the display device 10 will hereinafter be mainly described.

The display device 10 includes a display panel 100 providing a display screen, a display driver 200, a circuit board 300, and a touch driver 400. The touch driver 400 is configured to detect a touch input and may be referred to as a "touch detection device".

The display panel 100 may have a shape similar to a rectangular shape in a plan view. For example, the display panel 100 may have a shape similar to a rectangular shape, in a plan view, having short sides in the first direction X and long sides in the second direction Y. A corner where the short side in the first direction X and the long side in the second direction Y meet may be rounded with a predetermined curvature or right-angled. The shape of the display panel 100 in plan view is not limited to a rectangular shape, and may be a shape similar to other polygonal shapes, a circular shape, or an elliptical shape. In addition, the display panel 100 may also be flexibly formed to be curved, folded or bent.

The display panel 100 may include a main area MA and a sub-area SBA.

The main area MA may include a display area DA (including pixels emitting light to display an image) and a non-display area NDA disposed paritally or completely around the display area DA. The display area DA may emit light from a plurality of emission areas or a plurality of opening areas. For example, the display panel 100 may include pixel circuits including switching elements (switches), a pixel defining film defining the emission areas or the opening areas, and self-light emitting elements.

The non-display area NDA may be outside the display area DA. The non-display area NDA may be defined as an edge area of the main area MA of the display panel 100. The non-display area NDA may include a gate driver supplying gate signals to gate lines of the display panel 100.

The sub-area SBA may extend from one side of the main area MA. The sub-area SBA may be bent or folded to overlap the main area MA in the third direction Z. The sub-area SBA may include the display driver 200 and pad parts connected to the circuit board 300.

Referring to FIG. 2, the display panel 100 includes a display unit DU and a touch unit TSU. The display unit DU may include a plurality of pixels PX (e.g., see FIG. 3). The pixel PX is a basic unit that emits light for displaying a screen. One pixel PX may include a red sub-pixel, a green sub-pixel, and a blue sub-pixel, but may include a different combination of colored pixels in other embodiments. The plurality of pixels PX may be arranged in various ways. For example, the plurality of pixels may be alternately arranged in a plan view. In one example, the pixels PX may be disposed in a matrix form, but are not limited thereto.

The touch unit TSU may be disposed on the display unit DU, but the present disclosure is not limited thereto. For example, the touch unit TSU may be formed together with the display unit DU in an in-cell touch manner. The touch unit TSU may include a plurality of driving electrodes TE (e.g., see FIG. 5) and detecting electrodes RE (e.g., see FIG. 5) for detecting a user's touch in a capacitive (or resistive) manner, a plurality of touch driving lines TL connecting the plurality of driving electrodes TE to the touch driver 400, and a plurality of touch detecting lines RL. The touch unit TSU is a layer detecting a touch input and may function as a touch member. The touch unit TSU may determine whether or not a touch input has occurred and may calculate a corresponding position as touch input coordinates. A detailed description of embodiments of the display unit DU and the touch unit TSU will be provided with reference to FIGS. 4 to 7.

The display unit DU and the touch unit TSU may be disposed to overlap each other. For example, the display area DA may be an area displaying the screen and also an area detecting the touch input.

The sub-area SBA of the display panel 100 may extend from one side of the main area MA. The sub-area SBA may include a flexible material that may be bent, folded, and/or rolled. For example, a portion of the sub-area SBA may be bent from one side of the main area MA, and another portion of the sub-area SBA extending from the bent portion of the sub-area SBA may overlap the main area MA in the third direction (Z-axis direction). The sub-area SBA may include the display driver 200 and the pad parts connected to the circuit board 300.

Referring to FIG. 1, the display driver 200 may be disposed in the sub-area SBA of the display panel 100. In addition, the display driver 200 may be formed as at least one integrated circuit (IC) and may be mounted on the display panel 100 in a chip-on-plastic (COP) manner or a chip-on-glass (COG) manner.

The display driver 200 may output data signals and voltages for driving the display panel 100. The display driver 200 may supply data voltages to data lines of the display panel 100. The display driver 200 may supply source voltages to power lines of the display panel 100 and supply gate control signals to a gate driver.

The circuit board 300 may be disposed in the sub-area SBA of the display panel 100. Lead lines of the circuit board 300 may be electrically connected to the pad parts of the display panel 100. The circuit board 300 may be a flexible printed circuit board, a printed circuit board, or a flexible film such as a chip-on-film.

The circuit board 300 may include a plurality of conductive lines for transferring signals from a main circuit board to the display driver 200 or electrically connecting the touch driver 400 and the plurality of driving electrodes TE and detecting electrodes RE of the touch unit TSU to each other.

The touch driver 400 may be disposed in the sub-area SBA of the display panel 100. In one embodiment, the touch driver 400 may be mounted on the circuit board 300.

The touch driver 400 may determine whether or not a touch input has been performed and may calculate corresponding touch coordinates, for example, based on detection of a change in the amount of capacitance between the plurality of driving electrodes. The touch driver 400 may be formed as an integrated circuit (IC) and be mounted on the display panel 100 in a chip-on-plastic (COP) manner or a chip-on-glass (COG) manner.

Figure 3:
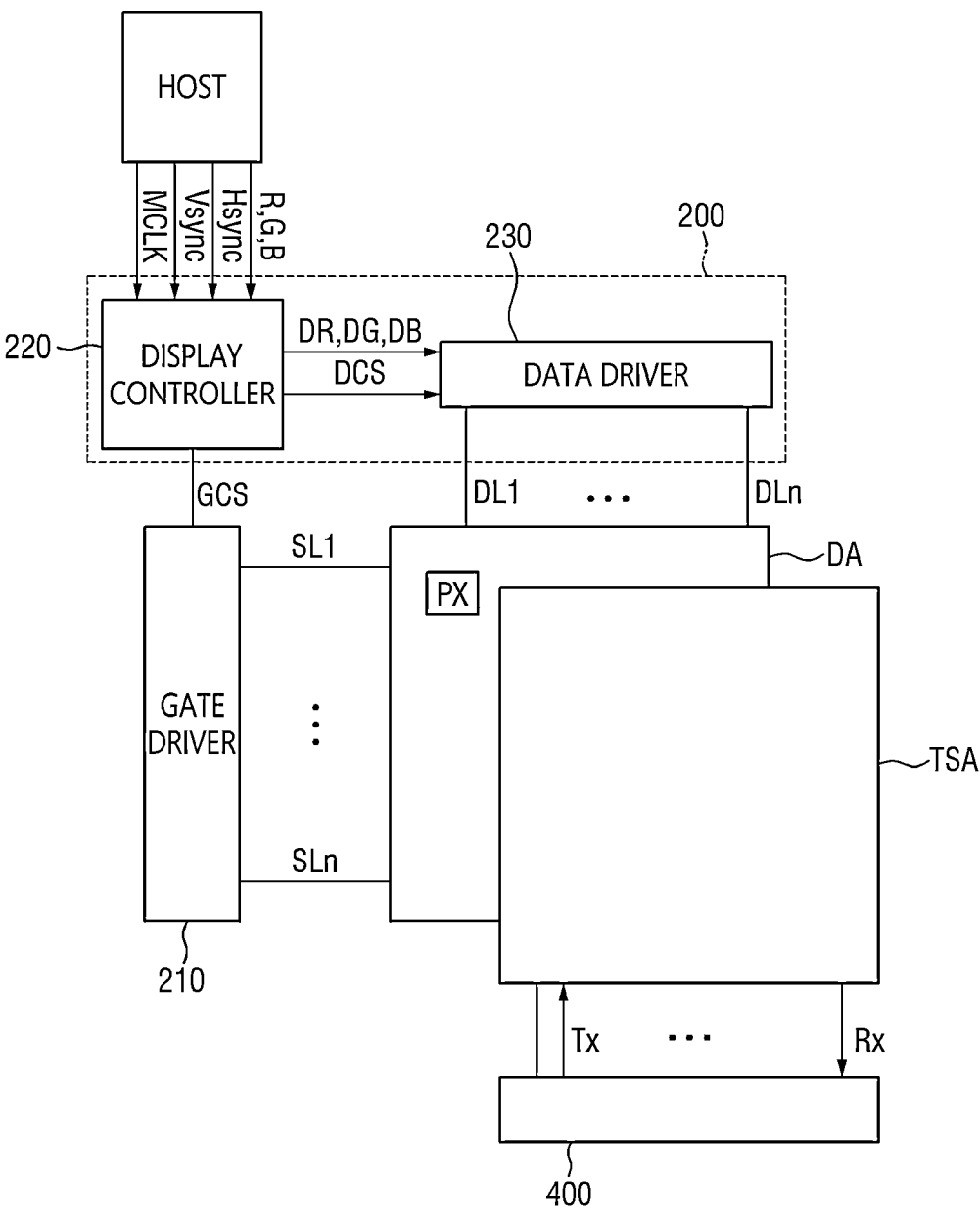
FIG. 3 is a conceptual diagram illustrating a display unit and a touch driver according to an exemplary embodiment.
Figure 4:
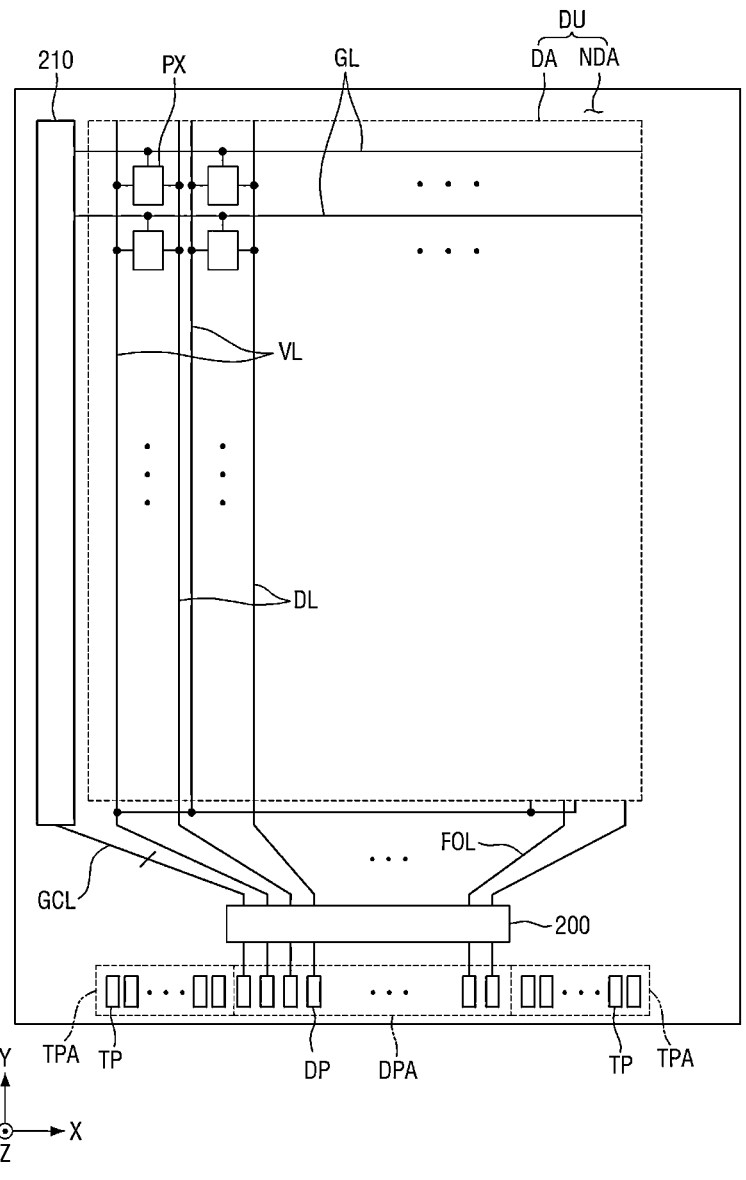
FIG. 4 is a schematic plan view illustrating the display unit of the display device according to an exemplary embodiment.

FIG. 3 is a conceptual diagram illustrating a display unit and a touch driver according to an exemplary embodiment. FIG. 4 is a schematic plan view illustrating the display unit of the display device according to an exemplary embodiment.

Referring to FIGS. 3 and 4, the display device 10 includes the display panel 100 including the plurality of pixels PX, the display driver 200, and the touch driver 400.

The display driver 200 may include a data driver 230 and a display controller 220.

The display controller 220 may receive input data R, G, and B and a timing control signal from an external device (e.g., a host). The timing control signal may include a vertical synchronization signal Vsync indicating one frame period, a horizontal synchronization signal Hsync indicating one horizontal period, and a main clock MCLK repeated at a predetermined cycle. The input data R, G, and B may be RGB data including red image data, green image data, and blue image data. The display controller 220 may generate output data signals DR, DG, and DB and one or more internal control signals based on the received input data R, G, and B and timing control signal. The internal control signals may include a data driver control signal DCS and a gate driver control signal GCS.

The display controller 220 may control operation of the data driver 230 by providing the data driver control signal DCS to a data driver 230. The display controller 220 may control operation of the gate driver 210 by providing the gate driver control signal GCS to the gate driver 210.

The data driver 230 may receive the output data signals DR, DG, and DB and the data driver control signal DCS from the display controller 220. The data driver 230 may generate data signals based on the received output data signals DR, DG, and DB and data driver control signal DCS. The data driver 230 may provide the generated data signals to the display panel 100. The data driver 230 may provide the data signals through a plurality of data lines DL (e.g., see FIG. 4) formed in the display panel 100.

The gate driver 210 may receive the gate driver control signal GCS from the display controller 220. The gate driver 210 may generate gate signals based on the received gate driver control signal GCS. The gate driver 210 may provide the generated gate signals to the display panel 100. The gate driver 210 may provide the gate signals to the plurality of pixels PX through a plurality of gate lines (e.g., GL in FIG. 4) formed in the display panel 100. A detailed description of embodiments of the plurality of data lines DL (see FIG. 4) and the plurality of gate lines GL (see FIG. 4) will be provided with reference to FIG. 4.

It has been illustrated in FIG. 3 that the display driver 200 does not include the gate driver 210, but the present disclosure is not limited thereto. For example, the gate driver 210 may be included in the display driver 200 to control operation of the display panel 100. The gate driver 210, the data driver 230, and the display controller 220 may be formed as integrated circuits (ICs). The gate driver 210 may be formed together with the data driver 230, for example, in a thin film transistor (TFT) process of the display panel 100. The display controller 220 and the data driver 230 may be incorporated with each other to be configured as timing controller embedded driver integrated circuits (TED).

The display panel 100 may include the plurality of pixels PX connected to the plurality of data lines DL (e.g., see FIG. 4) and the plurality of gate lines GL (e.g., see FIG. 4).

A frame frequency at which the display driver 200 drives the display panel 100 may vary. For example, the frame frequency may vary within a predetermined range (e.g., a range of 1 Hz to 240 Hz) according to host's or user's selection. In one embodiment, the display driver 200 may be driven at 60 Hz for one section and may change the frame frequency to 120 Hz for another section, for example, according to user's need.

Figure 5:
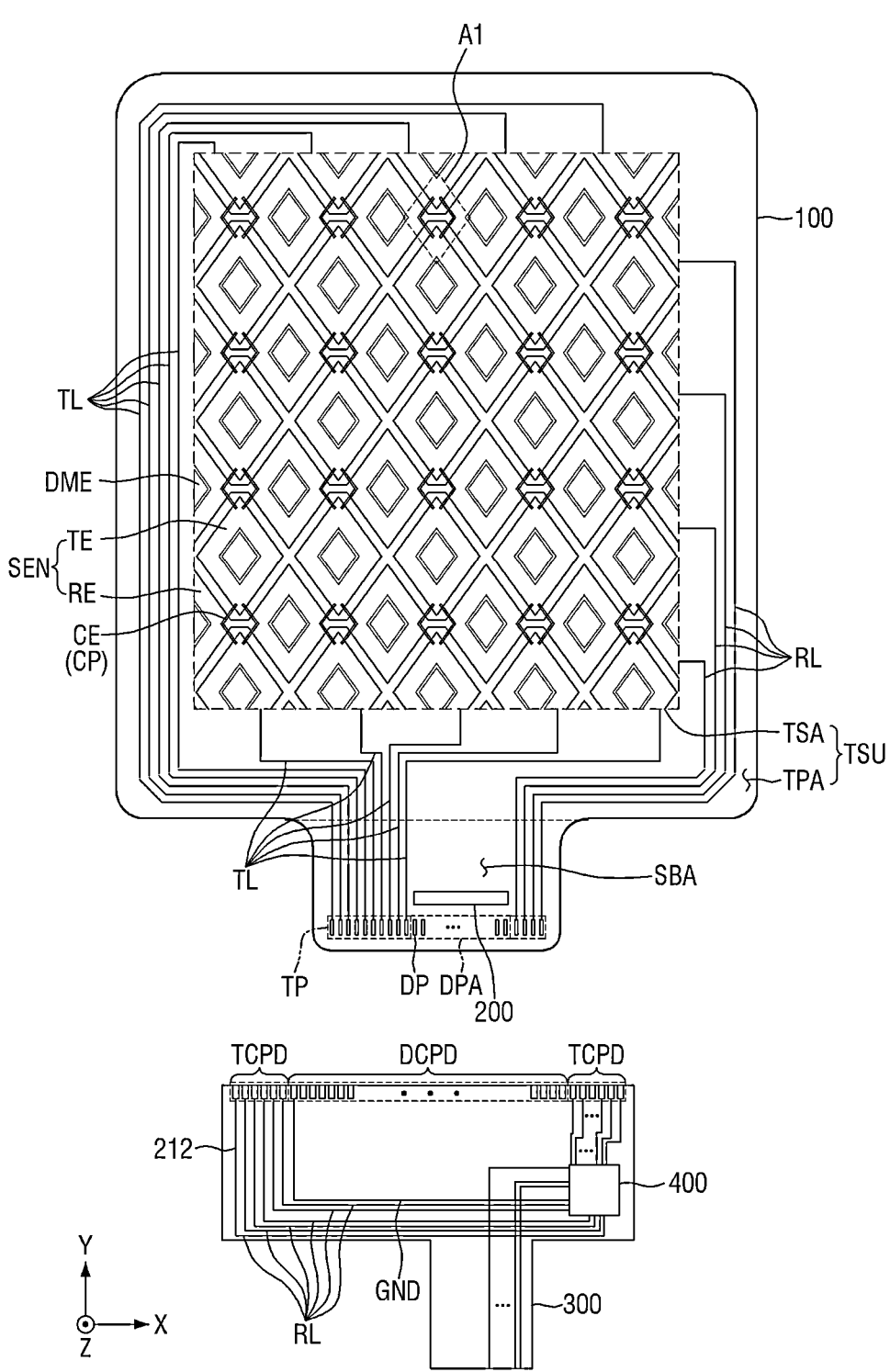
FIG. 5 is a plan view illustrating a touch unit of the display device according to an exemplary embodiment.

A touch area TSA may include the plurality of driving electrodes TE (see FIG. 5), detecting electrodes RE (see FIG. 5), and the plurality of touch driving lines TL (see FIG. 5) and touch detecting lines RL (see FIG. 5). The touch area TSA may detect a touch input by receiving electrical signals from the touch driver 400 disposed on the circuit board 300 through the plurality of touch driving lines TL or transmitting electrical signals detected from the plurality of detecting electrodes RE to the touch driver 400 through the plurality of touch detecting lines RL. For example, the touch driver 400 may detect the touch input by converting analog electrical signals detected in the touch area TSA into digital signals. A detailed description of an embodiment of the touch driver 400 will be provided with reference to FIG. 5.

Referring to FIG. 4, the display unit DU may include a display area DA and a non-display area NDA. The display unit DU may include the plurality of pixels PX and the plurality of gate lines GL and the plurality of data lines DL connected to the plurality of pixels PX.

The plurality of gate lines GL may supply the gate signals received from the gate driver 210 to the plurality of pixels PX. The plurality of gate lines GL may extend in the first direction X, and may be spaced apart from each other in the second direction Y crossing the first direction X.

The plurality of data lines DL may supply the output data signals DR, DG, and DB and the data signals received from the display driver 200 to the plurality of pixels PX. The plurality of data lines DL may extend in the second direction Y, and may be spaced apart from each other in the first direction X.

The non-display area NDA may surround the display area DA. For example, the non-display area NDA may include the gate driver 210 applying the gate signals to the plurality of gate lines GL, fan-out lines FOL connecting the plurality of data lines DL and the display driver 200 to each other, and display pad parts DP connected to the circuit board 300.

The display driver 200 may supply the gate driver control signal GCS to the gate driver 210 through a gate control line GCL. The gate driver 210 may generate a plurality of gate signals based on the gate driver control signal GCS, and may sequentially supply the plurality of gate signals to the plurality of gate lines GL according to a set order.

The display driver 200 may supply a first source voltage to first power lines VL through the data driver 230 and supply a second source voltage to second power lines. Each of the plurality of pixels PX may receive the first source voltage through the first power line VL and receive the second source voltage through the second power line. The first source voltage may be a predetermined high-level voltage, and the second source voltage may be a voltage lower than the first source voltage.

A display pad area DPA and touch pad areas TPA may be disposed at an edge of the display panel 100. The display pad area DPA may include a plurality of display pad parts DP, e.g., terminals, pads, or other conductors. The plurality of display pad parts DP may be connected to a main processor through the circuit board 300. The plurality of display pad parts DP may be connected to the circuit board 300 to receive digital video data, and may supply the digital video data to the display driver 200.

FIG. 5 is a plan view illustrating the touch unit TSU of the display device according to an exemplary embodiment. Referring to FIG. 5, the touch unit TSU may include a touch area TSA to detect a touch input (e.g., a user's touch or touch by an object such as a stylus) and a touch peripheral area TPA disposed around the touch area TSA. The touch area TSA may overlap the display area DA of the display panel 100, and the touch peripheral area TPA may overlap the non-display area NDA of the display panel 100.

The touch unit TSU may include the plurality of driving electrodes TE, the plurality of detecting electrodes RE, the plurality of touch driving lines TL, the plurality of touch detecting lines RL.

The circuit board 300 may include first circuit pad parts DCPD connected to the display pad parts DP of the display panel 100, second circuit pad parts TCPD connected to touch pad parts TP of the display panel 100, and touch circuit lines 212 connecting the second circuit pad parts TCPD and the touch driver 400 to each other. The plurality of driving electrodes TE and the plurality of detecting electrodes RE of the touch area TSA may be electrically connected to the touch driver 400 of the circuit board 300. The touch area TSA may receive electrical signals from the touch driver 400 disposed on the circuit board 300 through the plurality of touch driving lines TL and touch detecting lines RL, or may transmit electrical signals detected from the plurality of driving electrodes TE and detecting electrodes RE to the touch driver 400 through the plurality of touch driving lines TL and touch detecting lines RL.

The plurality of driving electrodes TE may be arranged in the first direction X and the second direction Y. The plurality of driving electrodes TE may be spaced apart from each other in the first direction X and the second direction Y. The driving electrodes TE adjacent to each other in the second direction Y may be electrically connected to each other through a bridge electrode CE.

The plurality of driving electrodes TE may be connected to the touch pad parts TP through the touch driving lines TL. Some of the plurality of touch driving lines TL may extend to the touch pad parts TP via the lower side of the touch peripheral area TPA. Some other of the plurality of touch driving lines TL may extend to the touch pad parts TP via the upper side, the left side, and/or the lower side of the touch peripheral area TPA. The touch pad parts TP may be connected to the touch driver 400 through the circuit board 300.

The display pad area DPA and the touch pad areas TPA may be disposed at a predetermined location, e.g., an edge, of the sub-area SBA of the display panel 100. The display pad area DPA and the touch pad areas TPA may be electrically connected to the circuit board 300 using a low-resistance and high-reliability material such as, but not limited to, an anisotropic conductive film.

The plurality of detecting electrodes RE may extend in the first direction X and may be spaced apart from each other in the second direction Y. The plurality of detecting electrodes RE may be arranged in the first direction X and the second direction Y, and the plurality of detecting electrodes RE adjacent to each other in the first direction X may be electrically connected to each other through a connection part.

The plurality of detecting electrodes RE may be connected to the touch pad parts TP through the plurality of touch detecting lines RL. For example, the plurality of detecting electrodes RE disposed on the right side of the touch area TSA may be connected to the touch pad parts TP through the plurality of touch detecting lines RL. The plurality of touch detecting lines RL may extend to the touch pad parts TP via the right side and the lower side of the touch peripheral area TPA. The touch pad parts TP may be connected to the touch driver 400 through the circuit board 300.

The plurality of driving electrodes TE and detecting electrodes RE may not hinder travel of light emitted from the display area DA. This may be accomplished by including a planar pattern formed of a transparent conductive layer or including a mesh pattern in which an opaque metal is used along an area in which light emitting elements are not disposed.

A touch driving signal may be applied from the touch driver 400 to each of the plurality of driving electrodes TE through any one of the plurality of touch driving lines TL. When the touch driving signals are applied to the plurality of driving electrodes TE, mutual capacitances may be formed between adjacent driving electrodes TE and detecting electrodes RE. When a touch input occurs from the outside, mutual capacitance values between the adjacent driving electrodes TE and detecting electrodes RE may change. The change in the mutual capacitances between the adjacent driving electrodes TE and detecting electrodes RE may be transferred to the touch driver 400 through the plurality of touch detecting lines RL. Accordingly, the touch driver 400 may determine whether or not the touch input has occurred, and may calculate a corresponding position as touch input coordinates. The touch detection may be performed in a mutual capacitive manner, but may be performed in a different manner in other embodiments.

A reference numeral GND (that is not described in FIG. 5) may denote a reference (e.g., ground) line formed on the circuit board 300. A symbol DME (that is not described in FIG. 5) may denote a dummy electrode. The plurality of driving electrodes TE, the plurality of detecting electrodes RE, and a plurality of dummy electrodes DE may be disposed at the same layer and may be spaced apart from each other.

Figure 6:
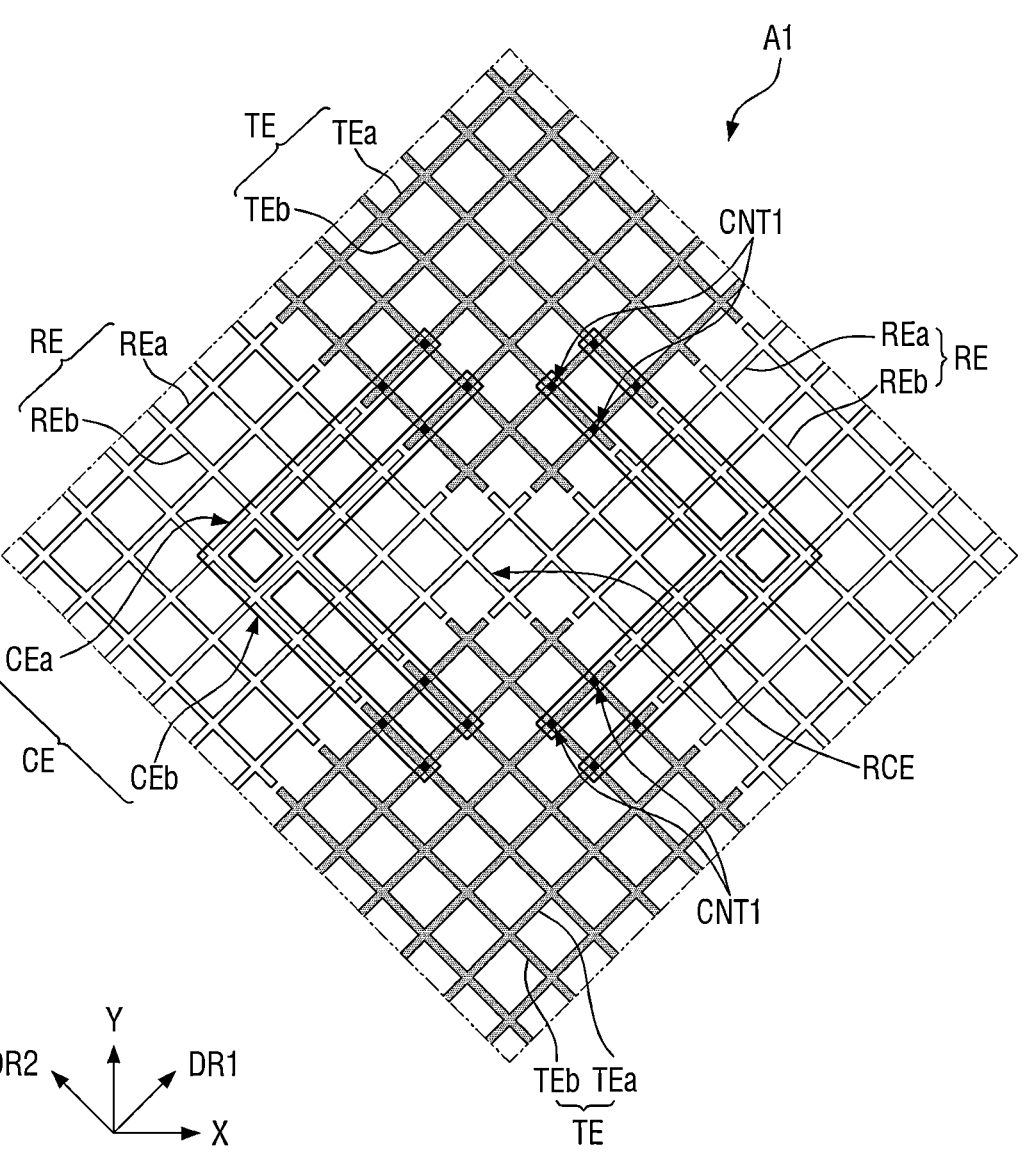
FIG. 6 is an enlarged view of area A1 of FIG. 5.
Figure 7:
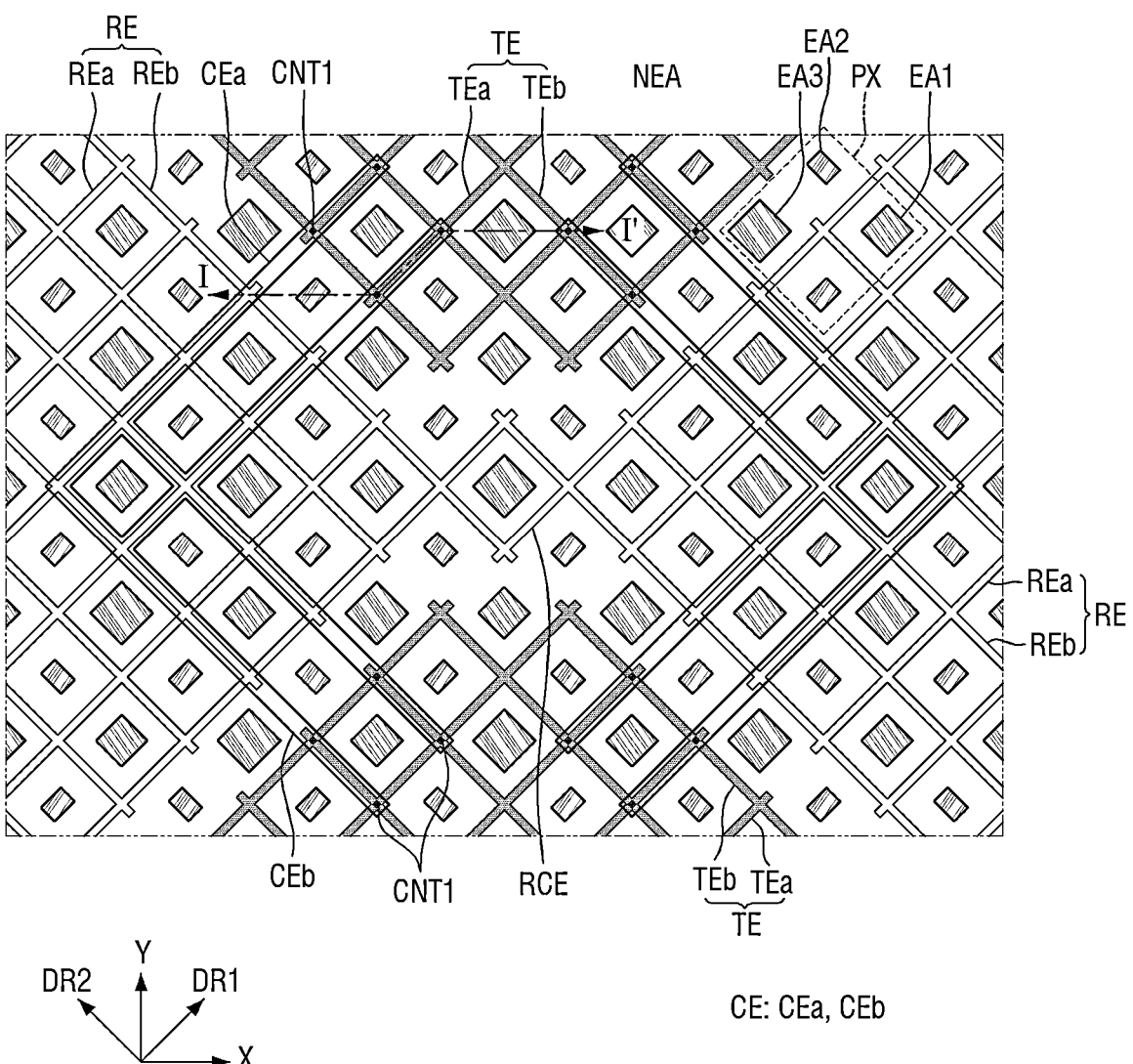
FIG. 7 is an enlarged view illustrating a portion of the display device according to an exemplary embodiment.

FIG. 6 is an enlarged view of area A1 of FIG. 5. FIG. 7 is an enlarged view illustrating a portion of the display device according to an exemplary embodiment.

Referring to FIGS. 6 and 7, the plurality of driving electrodes TE may be arranged in the first direction X and the second direction Y. The plurality of driving electrodes TE may be spaced apart from each other in the first direction X and the second direction Y. The driving electrodes TE, adjacent to each other in the second direction Y, may be electrically connected to each other through a bridge electrode CE.

The plurality of detecting electrodes RE may extend in the first direction X and may be spaced apart from each other in the second direction Y. The plurality of detecting electrodes RE may be arranged in the first direction X and the second direction Y. The detecting electrodes RE, adjacent to each other in the first direction X, may be electrically connected to each other through a connection part RCE. For example, the connection part RCE of the detecting electrodes RE may be disposed to traverse between the driving electrodes TE adjacent to each other.

A plurality of bridge electrodes CE may be disposed at a different layer from the driving electrodes TE and the detecting electrodes RE. The bridge electrode CE may include a first portion CEa and a second portion CEb. For example, the second portion CEb of the bridge electrode CE may be connected to the driving electrode TE disposed on one side through a first contact hole CNT1 and may extend in the other direction DR2. The first portion CEa of the bridge electrode CE may be bent (or angled) from the second portion CEb in an area overlapping the detecting electrode RE, may extend in one direction DR1, and may be connected to the driving electrode TE disposed on the other side through a first contact hole CNT1. One direction DR1 may be a direction between the first direction X and the second direction Y, and the other direction DR2 may be a direction crossing the one direction DR1. For example, each of the plurality of bridge electrodes CE may connect the driving electrodes TE adjacent to each other in the second direction Y to each other.

According to an exemplary embodiment, the plurality of driving electrodes TE, the plurality of detecting electrodes RE, and the plurality of dummy electrodes DME (e.g., see FIG. 5) may be formed to have a predetermined structure, e.g., may have a mesh structure or a net structure in a plan view. The plurality of driving electrodes TE, the plurality of detecting electrodes RE, and the plurality of dummy electrodes DME (e.g., see FIG. 5) may not overlap first to third emission areas EA1, EA2, and EA3 of the pixel PX. The plurality of bridge electrodes CE may not overlap the first to third emission areas EA1, EA2, and EA3. Accordingly, the display device 10 may prevent luminance of light emitted from the first to third emission areas EA1, EA2, and EA3 from being decreased by the touch unit TSU.

Each of the plurality of driving electrodes TE may include a first portion TEa extending in one direction DR1 and a second portion TEb extending in the other direction DR2. Each of the plurality of detecting electrodes RE may include a first portion REa extending in one direction DR1 and a second portion REb extending in the other direction DR2.

As another exemplary embodiment, the plurality of driving electrodes TE, the plurality of detecting electrodes RE, and the plurality of dummy electrodes DME (see FIG. 5) may be formed in an entire surface structure rather than a mesh structure or a net structure in plan view. In this case, the plurality of driving electrodes TE, the plurality of detecting electrodes RE, and the plurality of dummy electrodes DME (see FIG. 5) may include a transparent conductive material having high light transmittance, such as indium tin oxide (ITO) or indium zinc oxide (IZO).

The plurality of pixels PX may include first to third sub-pixels, and each of the first to third sub-pixels may include first to third emission areas EA1, EA2, and EA3. For example, the first emission area EA1 may emit light of a first color (e.g., red), the second emission area EA2 may emit light of a second color (e.g., green), and the third emission area EA3 may emit light of a third color (e.g., blue), but the emission areas EA1, EA2, and EA3 may emit light of a different combination of colors in another embodiment.

In one embodiment, each pixel PX may include one first emission area EA1, two second emission areas EA2, and one third emission area EA3 to express a white gradation. Accordingly, a white gradation may be expressed by a combination of light emitted from one first emission area EA1, light emitted from two second emission areas EA2, and light emitted from one third emission area EA3.

Figure 8:
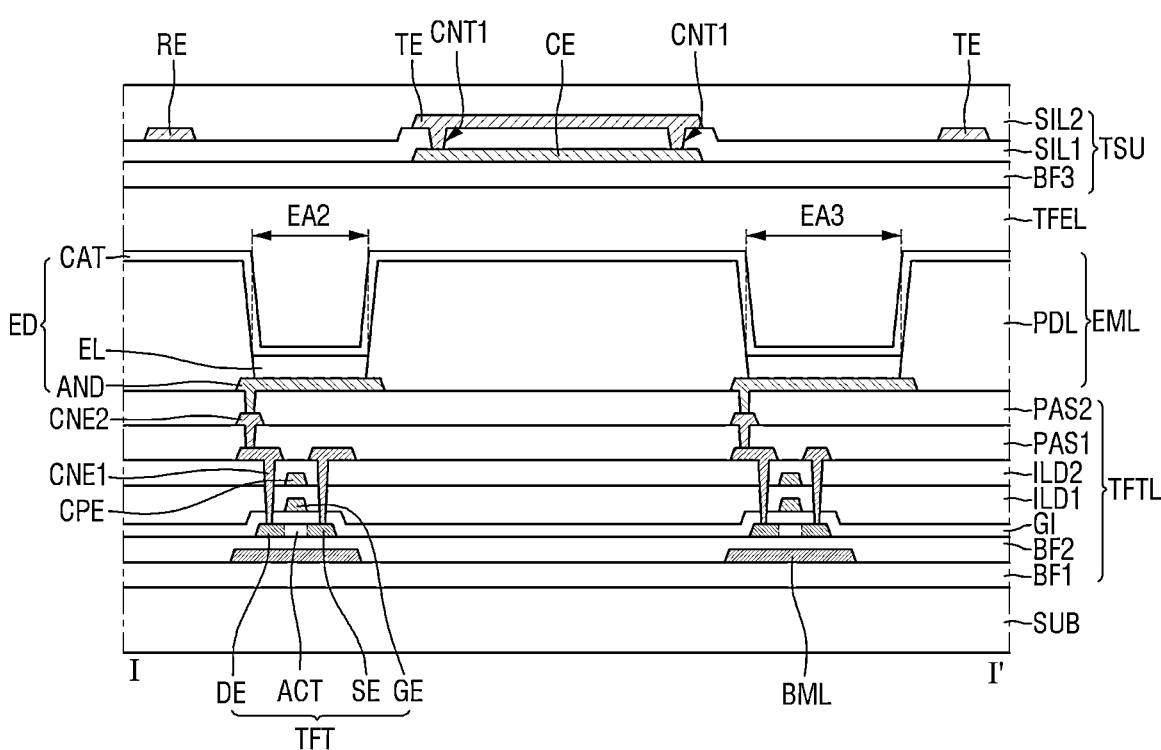
FIG. 8 is a cross-sectional view of the display device according to an exemplary embodiment taken along section line I-I' of FIG. 7.

FIG. 8 is a cross-sectional view taken along line I-I' of FIG. 7.

Referring to FIG. 8, the display panel 100 may include a display unit DU and a touch unit TSU. The display unit DU may include a substrate SUB, a thin film transistor layer TFTL, a light emitting element layer EML, and an encapsulation layer TFEL.

The substrate SUB may support the display panel 100. The substrate SUB may be a base substrate or a base member, and may be made of an insulating material such as a polymer resin. As an example, the substrate SUB may be a flexible substrate that may be bent, folded, or rolled. As another example, the substrate SUB may include a flexible material and/or a rigid material.

The thin film transistor layer TFTL may include first and second buffer layers BF1 and BF2, thin film transistors TFT, a gate insulating film GI, a first interlayer insulating film ILD1, capacitor electrodes CPE, a second interlayer insulating film ILD2, first connection electrodes CNE1, a first passivation layer PAS1, second connection electrodes CNE2, and a second passivation layer PAS2.

The first buffer layer BF1 may be disposed on the substrate SUB. The first buffer layer BF1 may include an inorganic film capable of preventing penetration of air, moisture, or debris. For example, the first buffer layer BF1 may include a plurality of inorganic films that are alternately stacked.

A light blocking layer BML may be disposed on the first buffer layer BF1. As an example, the light blocking layer BML may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof. As another example, the light blocking layer BML may be an organic film including a black pigment.

The second buffer layer BF2 may cover the first buffer layer BF1 and the light blocking layer BML. The second buffer layer BF2 may include an inorganic film capable of preventing penetration of air or moisture. For example, the second buffer layer BF2 may include a plurality of inorganic films that are alternately stacked.

The thin film transistor TFT may be disposed on the second buffer layer BF2, and may constitute a pixel circuit of each of the plurality of pixels. For example, the thin film transistor TFT may be a driving transistor or a switching transistor of the pixel circuit.

The thin film transistor TFT may include a semiconductor region ACT, a gate electrode GE, a source electrode SE, and a drain electrode DE. The semiconductor region ACT, the source electrode SE, and the drain electrode DE may be disposed on the second buffer layer BF2. The semiconductor region ACT may overlap the gate electrode GE in the thickness direction, and may be insulated from the gate electrode GE by the gate insulating film GI. The source electrode SE and the drain electrode DE may be formed by making a material of the semiconductor region ACT into conductors.

The gate electrode GE may be disposed on the gate insulating film GI. The gate electrode GE may overlap the semiconductor region ACT with the gate insulating film GI interposed therebetween.

The gate insulating film GI may be disposed on the semiconductor region ACT, the source electrode SE, and the drain electrode DE. For example, the gate insulating film GI may cover the semiconductor region ACT, the source electrode SE, the drain electrode DE, and the second buffer layer BF2, and may insulate the semiconductor region ACT and the gate electrode GE from each other. The gate insulating film GI may include a contact hole through which the first connection electrode CNE1 penetrates.

The first interlayer insulating film ILD1 may cover the gate electrode GE and the gate insulating film GI. The first interlayer insulating film ILD1 may include a contact hole through which the first connection electrode CNE1 penetrates. The contact hole of the first interlayer insulating film ILD1 may be connected to the contact hole of the gate insulating film GI and a contact hole of the second interlayer insulating film ILD2.

The capacitor electrode CPE may be disposed on the first interlayer insulating film ILD1. The capacitor electrode CPE may overlap the gate electrode GE in the third direction (Z-axis direction).

The second interlayer insulating film ILD2 may cover the capacitor electrode CPE and the first interlayer insulating film ILD1. The second interlayer insulating film ILD2 may include a contact hole through which the first connection electrode CNE1 penetrates. The contact hole of the second interlayer insulating film ILD2 may be connected to the contact hole of the first interlayer insulating film ILD1 and the contact hole of the gate insulating film GI.

The first connection electrode CNE1 may be disposed on the second interlayer insulating film ILD2. The first connection electrode CNE1 may connect the drain electrode DE of the thin film transistor TFT and the second connection electrode CNE2 to each other. The first connection electrode CNE1 may be inserted into the contact holes formed in the second interlayer insulating film ILD2, the first interlayer insulating film ILD1, and the gate insulating film GI to be in contact with the drain electrode DE of the thin film transistor TFT.

The first passivation layer PAS1 may cover the first connection electrode CNE1 and the second interlayer insulating film ILD2. The first passivation layer PAS1 may protect the thin film transistor TFT. The first passivation layer PAS1 may include a contact hole through which the second connection electrode CNE2 penetrates.

The second connection electrode CNE2 may be disposed on the first passivation layer PAS1. The second connection electrode CNE2 may connect the first connection electrode CNE1 and a first electrode AND of a light emitting element ED to each other. The second connection electrode CNE2 may be inserted into the contact hole provided in the first passivation layer PAS1 to be in contact with the first connection electrode CNE1.

The second passivation layer PAS2 may cover the second connection electrode CNE2 and the first passivation layer PAS1. The second passivation layer PAS2 may include a contact hole through which the first electrode AND of the light emitting element ED penetrates.

The light emitting element layer EML may be disposed on the thin film transistor layer TFTL. The light emitting element layer EML may include light emitting elements ED and a pixel defining film PDL. The light emitting element ED may include the first electrode (anode) AND, a light emitting layer EL, and a second electrode (cathode) CAT.

The first electrode AND may be disposed on the second passivation layer PAS2. The first electrode AND may be disposed to overlap one of the first to third emission areas EA1, EA2, and EA3 defined by the pixel defining film PDL. The first electrode AND may be connected to the drain electrode DE of the thin film transistor TFT through the first and second connection electrodes CNE1 and CNE2.

The light emitting layer EL may be disposed on the first electrode AND. For example, the light emitting layer EL may be an organic light emitting layer made of an organic material, but is not limited thereto. In a case where the light emitting layer EL is the organic light emitting layer, when the thin film transistor TFT applies a predetermined voltage to the first electrode AND of the light emitting element ED and the second electrode CAT of the light emitting element ED receives a common voltage or a cathode voltage, holes and electrons may move to the organic light emitting layer EL through a hole transport layer and an electron transport layer, respectively, and may be combined with each other in the organic light emitting layer EL to generate an emission of light.

The second electrode CAT may be disposed on the light emitting layer EL. For example, the second electrode CAT may not be divided for each of the plurality of pixels, and may be implemented in the form of a continuous electrode covering all the pixels in common. For example, as shown in part in FIG. 8, the second electrode CAT may be disposed on the light emitting layers EL in the first to third emission areas EA1, EA2, and EA3, and may be disposed on the pixel defining film PDL in an area other than the first to third emission areas EA 1, EA2, and EA3.

The pixel defining film PDL may include recesses which define the first to third emission areas EA1, EA2, and EA3. In addition, the pixel defining film PDL may space apart (e.g., be disposed between) and insulate from each other the first electrodes AND of a plurality of light emitting elements ED.

The encapsulation layer TFEL may be disposed on the second electrode CAT to cover the plurality of light emitting elements ED. The encapsulation layer TFEL may include at least one inorganic film to prevent oxygen or moisture from permeating into the light emitting element layer EML. The encapsulation layer TFE may include at least one organic film to protect the light emitting element layer EML from foreign substances such as dust.

The touch unit TSU may be disposed on the encapsulation layer TFEL. The touch unit TSU may include a plurality of layers, e.g., may include a third buffer layer BF3, bridge electrodes CE, a first insulating layer SIL1, driving electrodes TE, detecting electrodes RE, and a second insulating layer SIL2.

The third buffer layer BF3 may be disposed on the encapsulation layer TFEL. The third buffer layer BF3 may perform insulating and optical functions. The third buffer layer BF3 may include at least one inorganic film. In one embodiment, the third buffer layer BF3 may be omitted.

The bridge electrode CE may be disposed on the third buffer layer BF3. The bridge electrode CE may be disposed at a different layer from the driving electrode TE and the detecting electrode RE. The bridge electrode CE may connect the driving electrodes TE that are adjacent to each other in the second direction Y. For example, the bridge electrode CE may be formed as a single layer made of molybdenum (Mo), titanium (Ti), copper (Cu), or aluminum (Al), or may be formed as a stacked structure (Ti/Al/Ti) of aluminum and titanium, a stacked structure (ITO/Al/ITO) of aluminum and ITO, an APC alloy, and/or a stacked structure (ITO/APC/ITO) of an APC alloy and ITO.

The first insulating layer SIL1 may cover the bridge electrode CE and the third buffer layer BF3. The first insulating layer SIL1 may perform insulating and optical functions. For example, the first insulating layer SIL1 may be formed as an inorganic film such as a silicon nitride layer, a silicon oxynitride layer, a silicon oxide layer, a titanium oxide layer, or an aluminum oxide layer.

The driving electrode TE and the detecting electrode RE may be disposed on the first insulating layer SIL1. The driving electrode TE and the detecting electrode RE may be formed to be at different levels, for example, as a result of a raised portion of the first insulating layer SIL1 overlapping the bridge electrode CE. Each of the driving electrode TE and the detecting electrode RE may be arranged so that they do not overlap the first to third emission areas EA1, EA2, and EA3. Each of the driving electrode TE and the detecting electrode RE may be formed as a single layer made of molybdenum (Mo), titanium (Ti), copper (Cu), or aluminum (Al), or may be formed as a stacked structure (Ti/Al/Ti) of aluminum and titanium, a stacked structure (ITO/Al/ITO) of aluminum and ITO, an APC alloy, and/or a stacked structure (ITO/APC/ITO) of an APC alloy and ITO.

The second insulating layer SIL2 may cover the driving electrode TE, the detecting electrode RE, and the first insulating layer SIL1. The second insulating layer SIL2 may perform insulating and optical functions. The second insulating layer SIL2 may be made, for example, of the same material as the first insulating layer SIL1.

In FIG. 8, the bridge electrode CE is formed at a layer below the driving electrode TE and the detecting electrode RE, but the present disclosure is not limited thereto. For example, the bridge electrode CE may be formed at a layer above the driving electrode TE and the detecting electrode RE in another embodiment.

Comparative Example

Figure 9:
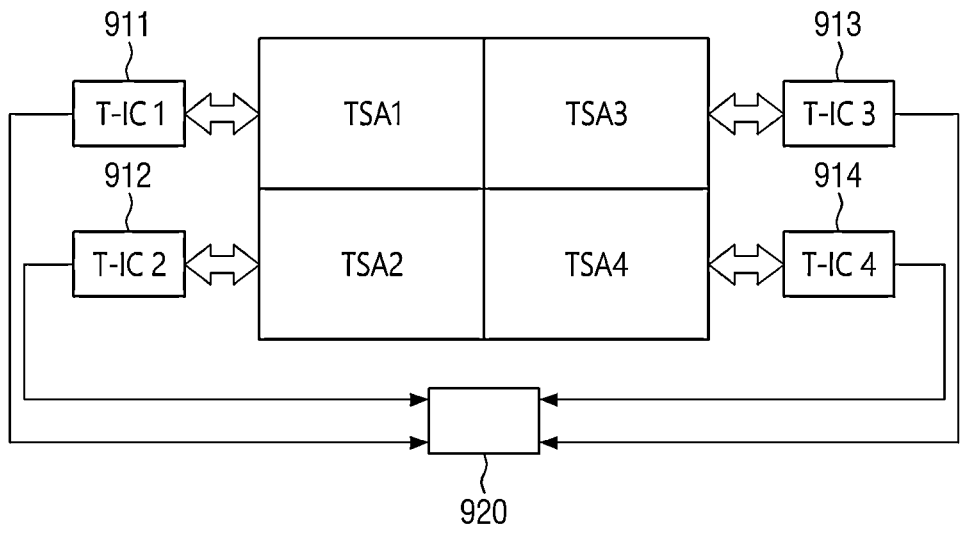
FIG. 9 is a schematic configuration diagram of a touch unit of a display device according to a comparative example.

FIG. 9 is a schematic configuration diagram of a touch unit TSU of a display device according to a comparative example.

Referring to FIG. 9, the touch unit TSU (e.g., a touch detection device or a touch detection module) of the display device according to a comparative example may have a touch area TSA in which touch sensors (e.g., driving electrodes and detecting electrodes) are disposed, and the touch area may be connected to a plurality of touch ICs 911, 912, 913, and 914. According to the comparative example, the touch area TSA may be divided into a plurality of sub-touch areas. For example, the display device 10 according to the comparative example may be a large-sized display device 10 such as a television (TV) or a monitor. Accordingly, the area of the touch unit TSU may be increased to have a large size. In such a display device according to the comparative example, the area of the touch unit TSU increases to a large size, and accordingly the touch area TSA may be divided into and driven as the plurality of sub-touch areas.

As shown in the comparative example, the touch area TSA may be divided into four sub-touch areas: a first sub-touch area TSA1, a second sub-touch area TSA2, a third sub-touch area TSA3, and a fourth sub-touch area TSA4. The first sub-touch area TSA1, the second sub-touch area TSA2, the third sub-touch area TSA3, and the fourth sub-touch area TSA4 may be disposed in a matrix form. For example, among the plurality of sub-touch areas divided in the matrix form from the touch area TSA, the first sub-touch area TSA1 may be disposed in a first row and first column (e.g., an upper left end), the second sub-touch area TSA2 may be disposed in a second row and first column (e.g., a lower left end), the third sub-touch area TSA3 may be disposed in a first row and second column (e.g., an upper right end), and the fourth sub-touch area TSA4 may be disposed in a second row and second column (e.g., a lower right end). Areas of the first sub-touch area TSA1, the second sub-touch area TSA2, the third sub-touch area TSA3, and the fourth sub-touch area TSA4 may be substantially the same as each other.

According to the comparative example, the touch unit TSU of the display device 10 may include a touch IC for each sub-touch area because the size of the touch area TSA is increased. For example, the touch unit TSU of the display device 10 according to the comparative example may include a plurality of touch ICs 911, 912, 913, and 914, which may be provided to correspond to the plurality of sub-touch areas TSA1, TSA2, TSA3, and TSA4, respectively, in a one-to-one manner. For example, the touch unit TSU of the display device according to a comparative example may include a first touch IC 911 connected to the first sub-touch area TSA1, a second touch IC 912 connected to the second sub-touch area TSA2, a third touch IC 913 connected to the third sub-touch area TSA3, and a fourth touch IC 914 connected to the fourth sub-touch area TSA4.

According to the comparative example, the plurality of touch ICs 911, 912, 913, and 914 (which are provided to correspond to the plurality of sub-touch areas TSA1, TSA2, TSA3, and TSA4, respectively, in the one-to-one manner) may be connected to and driven by a processor 920. For example, according to the comparative example, the touch unit TSU of the display device may include a single processor 920, which may control the plurality of touch ICs 911, 912, 913, and 914.

The processor 920 may control each of the plurality of touch ICs 911, 912, 913, and 914 to supply driving signals to driving electrodes included in the sub-touch areas connected to the plurality of touch ICs 911, 912, 913, and 914. The processor 920 may control each of the plurality of touch ICs 911, 912, 913, and 914 to receive touch detection signals from detecting electrodes RE included in the sub-touch areas connected to the plurality of touch ICs 911, 912, 913, and 914 and generate touch identification data based on the received touch detection signals. The processor 920 may receive the touch identification data from each of the plurality of touch ICs 911, 912, 913, and 914 and generate touch data indicating whether or not a touch has occurred based on the received touch identification data.

Figure 10:
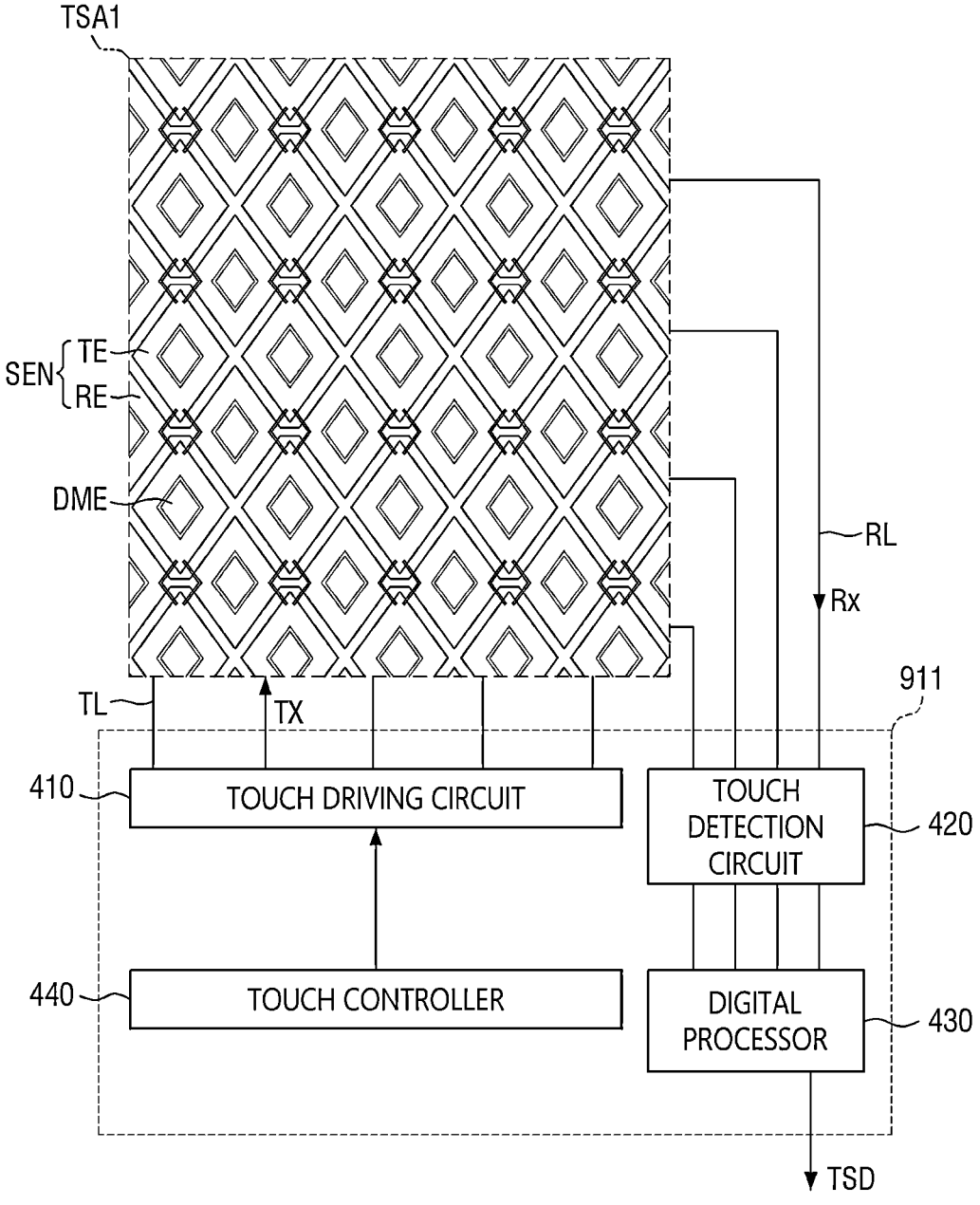
FIG. 10 is a block diagram illustrating a first sub-touch area and a first touch integrated chip (IC) according to a comparative example illustrated in FIG. 9.

FIG. 10 is a block diagram illustrating a first sub-touch area TSA1 and a first touch IC 911 according to the comparative example illustrated in FIG. 9.

Referring to FIG. 10, the first touch IC 911 according to the comparative example may include a touch driving circuit 410, a touch detection circuit 420, a digital processor 430, and a touch controller 440. Although not illustrated, the touch ICs 912, 913, and 914 other than the first touch IC 911 may include substantially the same components as the first touch IC 911. For example, each of the second touch IC 912, the third touch IC 913, and the fourth touch IC 914 may include a touch driving circuit 410, a touch detection circuit 420, a digital processor 430, and a touch controller 440, like the first touch IC 911.

The touch driving circuit 410 may be connected to a plurality of driving electrodes TE, formed in the first sub-touch area TSA1, through touch driving lines TL. The touch driving circuit 410 may supply touch driving signals to the plurality of driving electrodes TE. The touch driving signal may be a signal having a plurality of driving pulses. The touch driving circuit 410 may supply the touch driving signals to the touch driving lines TL based on a preset order. For example, the touch driving circuit 410 may sequentially output the touch driving signals from a driving electrode TE disposed on one side of the first sub-touch area TSA1 to a driving electrode TE disposed on the other side of the first sub-touch area TSA1.

The touch detection circuit 420 may be connected to a plurality of detecting electrodes RE formed in the first sub-touch area TSA1 through touch detecting lines RL. The touch detection circuit 420 may sense change amounts in mutual capacitance between the plurality of driving electrodes TE and the plurality of detecting electrodes RE through the touch detecting lines RL. For example, the touch detection circuit 420 may include an integrating circuit including at least one operational amplifier for detecting a change in capacitance from the detecting electrode RE of the touch unit TSU and a capacitor having a predetermined capacitance. An inverting input terminal of the operational amplifier may be connected to the detecting electrode RE to output the change in capacitance as an analog signal.

The touch detection circuit 420 may include a capacitor, a switch, a resistor, an amplifier, and a sample and holder, and an implementation form of the touch detection circuit 420 is not limited. For example, a voltage corresponding to electric charges charged in the capacitor may be sampled and then held for a predetermined period by the sample and holder.

As another example, the touch driving circuit 410 may supply the touch driving signals to the plurality of driving electrodes TE, and the touch detection circuit 420 may supply the touch driving signals to the plurality of detecting electrodes RE. In this case, the touch driving circuit 410 may sense change amounts in electric charges of the plurality of driving electrodes TE, and the touch detection circuit 420 may sense change amounts in electric charges of the plurality of detecting electrodes RE. Accordingly, each of the touch driving circuit 410 and the touch detection circuit 420 may sense change amounts in self-capacitance formed in the plurality of driving electrodes TE and the plurality of detecting electrodes RE.

The touch detection circuit 420 may receive touch signals RX through the touch detecting lines RL. The touch signal RX may be an analog signal having a plurality of driving pulses. The touch signal RX may be a sine wave, a pulse wave, or a ramp wave having any frequency (or cycle), but is not limited thereto. The touch detection circuit 420 may output the touch signal RX including the analog signal to the digital processor 430.

The digital processor 430 may receive the touch signal RX from the touch detection circuit 420. The digital processor 430 may convert the touch signal RX including the analog signal into touch sensing data, which is digital data.

When a detected voltage of the touch signal RX is greater than a predetermined value, the digital processor 430 may determine that a touch input has occurred. For example, the touch signal RX may have a capacitance change as an analog waveform. The digital processor 430 may generate the touch sensing data by calculating an amplitude and a phase of the touch signal RX and converting the analog signal into a digital signal. In addition, the digital processor 430 may generate touch identification data TSD based on the touch sensing data. The digital processor 430 may supply the generated touch identification data TSD to the processor 920 as touch information related to the first sub-touch area TSA1.

The touch controller 440 may control a driving timing of the touch driving circuit 410. The touch controller 440 may output a timing signal for controlling the driving timing of the touch driving circuit 410 to the touch driving circuit 410. The touch controller 440 may control a driving timing for synchronization of the touch driving circuit 410, the touch detection circuit 420, and the digital processor 430.

The display device according to the comparative example described with reference to FIGS. 9 and 10 is required to include the plurality of touch ICs 911, 912, 913, and 914 in order to drive the touch unit TSU as the area (or size) of the touch unit TSU increases. As described above, each of the plurality of touch ICs 911, 912, 913, and 914 includes circuits processing the digital data and generating the control signals, such as the touch controller and the digital processor. Each of the plurality of touch ICs 911, 912, 913, and 1914 may also include the touch driving circuit and the touch detection circuit for processing the analog signals. These features of the comparative example may cause an increase in manufacturing costs of the display device.

Embodiments

Hereinafter, exemplary embodiments capable of facilitating implementation and design of ICs for driving touch sensors included in display device 10 are described. The embodiments may apply for driving touch sensors in display device 10 of any size. For illustrative purposes, display device 10 is described as having a relatively large size. For example, the display device 10 according to an exemplary embodiment may be a large-sized display device 10 such as a TV or a monitor. As will become apparent, these embodiments may reduce manufacturing costs unlike the display device according to the comparative example described with reference to FIGS. 9 and 10 and the touch unit TSU included therein.

Figure 11:
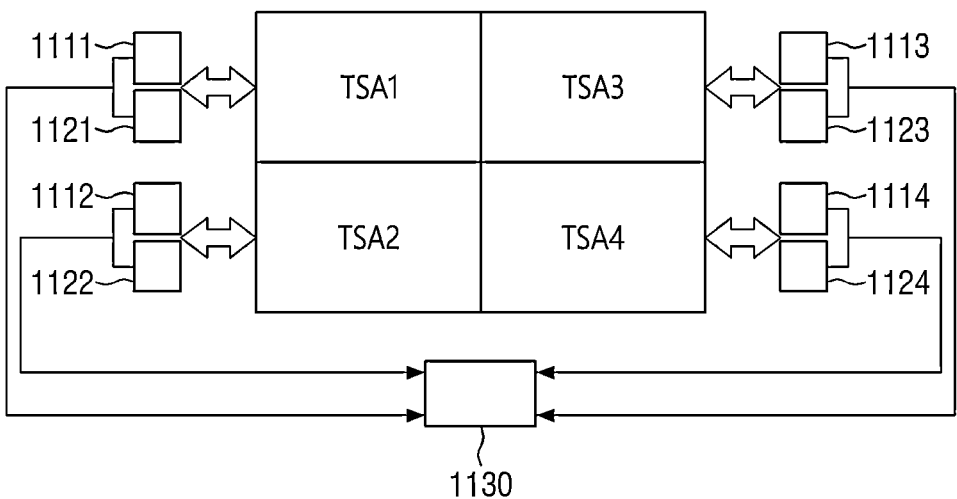
FIG. 11 is a schematic configuration diagram of a touch unit of the display device according to an exemplary embodiment.

FIG. 11 is a schematic configuration diagram of a touch unit TSU of the display device 10 according to an exemplary embodiment.

Referring to FIG. 11, the touch unit TSU (e.g., a touch detection device or a touch detection module) of display device 10 according to an exemplary embodiment may include a touch area in which touch sensors are disposed. The touch area TSA may be connected to a plurality of driving ICs 1111, 1112, 1113, and 1114 and a plurality of detecting ICs 1121, 1122, 1123, and 1124. According to an exemplary embodiment, the touch area TSA may be divided into a plurality of sub-touch areas, e.g., four or less than or greater than four. For example, as previously indicated, the display device 10 according to an exemplary embodiment may be a large-sized display device 10 such as a TV or a monitor. Accordingly, the area of the touch unit TSU may be proportionally large. In such a display device 10 according to an exemplary embodiment, the area of the touch unit TSU increases to a large size, and accordingly the touch area TSA may be divided into and driven as the plurality of sub-touch areas TSA1, TSA2, TSA3, and TSA4.

According to an exemplary embodiment, the touch area TSA may be divided into a first sub-touch area TSA1, a second sub-touch area TSA2, a third sub-touch area TSA3, and a fourth sub-touch area TSA4. The first sub-touch area TSA1, the second sub-touch area TSA2, the third sub-touch area TSA3, and the fourth sub-touch area TSA4 may be disposed, for example, in a matrix form. For example, among the plurality of sub-touch areas divided in the matrix form from the touch area TSA, the first sub-touch area TSA1 may be disposed in a first row and first column (e.g., an upper left end with respect to the center of the touch area), the second sub-touch area TSA2 may be disposed in a second row and first column (e.g., a lower left end with respect to the center of the touch area), the third sub-touch area TSA3 may be disposed in a first row and second column (e.g., an upper right end with respect to the center of the touch area), and the fourth sub-touch area TSA4 may be disposed in a second row and second column (e.g., a lower right end with respect to the center of the touch area). Areas of the first sub-touch area TSA1, the second sub-touch area TSA2, the third sub-touch area TSA3, and the fourth sub-touch area TSA4 may be substantially the same as each other, although in another embodiment the sub-touch areas may be different in area.

Additionally, one boundary portion of the first sub-touch area TSA1 (e.g., a right boundary portion of the first sub-touch area TSA1) may be adjacent to one boundary portion of the third sub-touch area TSA3 (e.g., a left boundary portion of the third sub-touch area TSA3).

Another boundary portion of the first sub-touch area TSA1 (e.g., a lower boundary portion of the first sub-touch area TSA1) may be adjacent to one boundary portion of the second sub-touch area TSA2 (e.g., an upper boundary portion of the second sub-touch area TSA2).

Another boundary portion of the third sub-touch area TSA3 (e.g., a lower boundary portion of the third sub-touch area TSA3) may be adjacent to one boundary portion of the fourth sub-touch area TSA4 (e.g., an upper boundary portion of the fourth sub-touch area TSA4).

Another boundary portion of the second sub-touch area TSA2 (e.g., a right boundary portion of the second sub-touch area TSA2) may be adjacent to another boundary portion of the fourth sub-touch area TSA4 (e.g., a left boundary portion of the fourth sub-touch area TSA4).

According to an exemplary embodiment, the touch unit TSU of the display device 10 may include a driving IC and a detecting IC for each sub-touch area, which may be beneficial as the size of the touch area TSA increases. For example, the touch unit TSU of the display device 10 according to an exemplary embodiment may include a plurality of driving ICs 1111, 1112, 1113, and 1114 and a plurality of detecting ICs 1121, 1122, 1123, and 1124.

The plurality of driving ICs 1111, 1112, 1113, and 1114 may be provided to correspond to the plurality of sub-touch areas TSA1, TSA2, TSA3, and TSA4, respectively, e.g., in a one-to-one manner. For example, the touch unit TSU of the display device 10 according to an exemplary embodiment may include a first driving IC 1111 connected to the first sub-touch area TSA1, a second driving IC 1112 connected to the second sub-touch area TSA2, a third driving IC 1113 connected to the third sub-touch area TSA3, and a fourth driving IC 1114 connected to the fourth sub-touch area TSA4. In one embodiment, the first driving IC 1111, the second driving IC 1112, the third driving IC 1113, and the fourth driving IC 1114 may include substantially the same circuit configuration and structure.

The plurality of detecting ICs 1121, 1122, 1123, and 1124 may be provided to correspond to the plurality of sub-touch areas TSA1, TSA2, TSA3, and TSA4, respectively, e.g., in a one-to-one manner. For example, the touch unit TSU of the display device 10 according to an exemplary embodiment may include a first detecting IC 1121 connected to the first sub-touch area TSA1, a second detecting IC 1122 connected to the second sub-touch area TSA2, a third detecting IC 1123 connected to the third sub-touch area TSA3, and a fourth detecting IC 1124 connected to the fourth sub-touch area TSA4. The first detecting IC 1121, the second detecting IC 1122, the third detecting IC 1123, and the fourth detecting IC 1124 may include substantially the same circuit configuration, but may have different circuit configurations in other embodiments.

According to an exemplary embodiment, the plurality of driving ICs 1111, 1112, 1113, and 1114 and the plurality of detecting ICs 1121, 1122, 1123, and 1124 may be connected to a processor 1130 and driven based on the control of the processor 1130. For example, the touch unit TSU of the display device 10 according to an exemplary embodiment may include a single processor 1130, which may control the plurality of driving ICs 1111, 1112, 1113, and 1114 and the plurality of detecting ICs 1121, 1122, 1123, and 1124.

The processor 1130 may control each of the plurality of driving ICs 1111, 1112, 1113, and 1114 to supply driving signals to driving electrodes TE included in the sub-touch areas connected to the plurality of driving ICs 1111, 1112, 1113, and 1114. The processor 1130 may control each of the plurality of detecting ICs 1121, 1122, 1123, and 1124 to receive touch detection signals from detecting electrodes RE included in the sub-touch areas connected to the plurality of detecting ICs 1121, 1122, 1123, and 1124 and generate touch identification data based on the received touch detection signals. The processor 1130 may receive the touch identification data from each of the plurality of detecting ICs 1121, 1122, 1123, and 1124 and generate touch data indicating whether or not a touch has occurred based on the received touch identification data.

Figure 12:
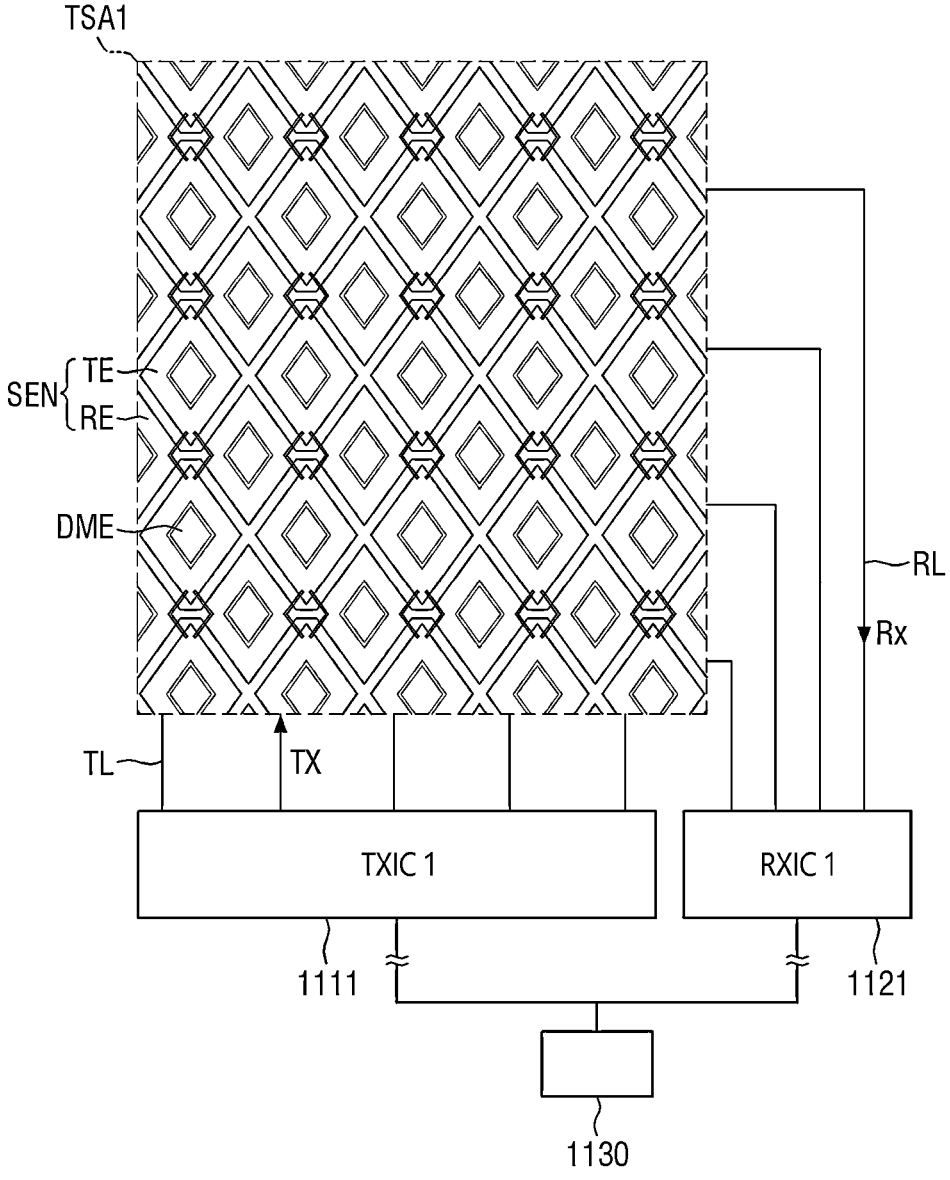
FIG. 12 is a block diagram illustrating a first sub-touch area and a first touch driving IC and a first touch detecting IC connected to the first sub-touch area according to an exemplary embodiment illustrated in FIG. 11.

FIG. 12 is a block diagram illustrating an embodiment of the first sub-touch area TSA1 and the first touch driving IC and the first touch detecting IC connected to the first sub-touch area, according to the exemplary embodiment illustrated in FIG. 11.

Referring to FIG. 12, the first sub-touch area TSA1 according to an exemplary embodiment may be connected to the first driving IC 1111 and the first detecting IC 1121. The driving ICs 1112, 1113, and 1114 other than the first driving IC 1111 may include substantially the same components as the first driving IC 1111. For example, each of the second driving IC 1112, the third driving IC 1113, and the fourth driving IC 1114 may be configured to perform substantially the same function as the first driving IC 1111 relative to their respective sub-touch areas. The detecting ICs, other than the first detecting IC 1121, may include substantially the same components as the first detecting IC 1121. For example, each of the second detecting IC 1122, the third detecting IC 1123, and the fourth detecting IC 1124 may be configured to perform substantially the same function as the first detecting IC 1121 relative to their respective sub-touch areas.

The first driving IC 1111 may be connected to a plurality of driving electrodes TE formed in the first sub-touch area TSA1 through touch driving lines TL. The first driving IC 1111 may supply touch driving signals to the plurality of driving electrodes TE. The touch driving signal may be a signal having a plurality of driving pulses. In one embodiment, the first driving IC 1111 may supply the touch driving signals to the touch driving lines TL based on a preset order. For example, the first driving IC 1111 may sequentially output the touch driving signals from a driving electrode TE disposed on one side of the first sub-touch area TSA1 to a driving electrode TE disposed on another side (e.g., an opposing side) of the first sub-touch area TSA1. The first driving IC 1111 may output the touch driving signals in a different preset order in another embodiment.

The first detecting IC 1121 may be connected to a plurality of detecting electrodes RE formed in the first sub-touch area TSA1 through touch detecting lines RL. The first detecting IC 1121 may sense change amounts in mutual capacitance between the plurality of driving electrodes TE and the plurality of detecting electrodes RE through the touch detecting lines RL. For example, the first detecting IC

1121 may include an integrating circuit including at least one operational amplifier for detecting a change in capacitance from the detecting electrode RE of the touch unit TSU and a capacitor having a predetermined capacitance. An inverting input terminal of the operational amplifier may be connected to the detecting electrode RE to output the change in capacitance as an analog signal.

The first detecting IC 1121 may include a capacitor, a switch, a resistor, an amplifier, and a sample-and-hold circuit, but the first detecting IC 1121 may have a different circuit configuration in another embodiment. For example, a voltage corresponding to electric charges charged in the capacitor may be sampled and then held for a predetermined period by the sample-and-hold circuit.

In one example, the first driving IC 1111 may supply the touch driving signals to the plurality of driving electrodes TE, and the first detecting IC 1121 may supply the touch driving signals to the plurality of detecting electrodes RE. In this case, the first driving IC 1111 may sense change amounts in electric charges of the plurality of driving electrodes TE, and the first detecting IC 1121 may sense change amounts in electric charges of the plurality of detecting electrodes RE. Accordingly, each of the first driving IC 1111 and the first detecting IC 1121 may sense change amounts in self-capacitance formed in the plurality of driving electrodes TE and the plurality of detecting electrodes RE.

The first detecting IC 1121 may receive touch signals RX through the touch detecting lines RL. The touch signal RX may be an analog signal having a plurality of driving pulses. For example, the touch signal RX may be a sine wave, a pulse wave, or a ramp wave having any frequency (or cycle), but is not limited thereto. The first detecting IC 1121 may transfer the touch signal RX including the analog signal to the processor 1130.

The processor 1130 may receive the touch signal RX from the first detecting IC 1121 and convert the touch signal RX including the analog signal into touch sensing data, which is digital data. When a detected voltage of the touch signal RX input from the first detecting IC 1121 is greater than a predetermined value, the processor 1130 may determine that a touch input has occurred. The processor 1130 may generate touch identification data TSD corresponding to each of the plurality of sub-touch areas based on the touch sensing data. The processor 1130 may calculate touch data by combining touch identification data TSD corresponding to each of the plurality of sub-touch areas with each other.

The processor 1130 may control driving timings of the plurality of driving ICs 1111, 1112, 1113, and 1114 including the first driving IC 1111. The processor 1130 may control driving timings of the plurality of detecting ICs 1121, 1122, 1123, and 1124 including the first detecting IC 1121. The processor 1130 may control synchronization of the plurality of driving ICs 1111, 1112, 1113, and 1114 and the plurality of detecting ICs 1121, 1122, 1123, and 1124.

Unlike the display device 10 according to the comparative example described with reference to FIGS. 9 and 10, the display device 10 according to the exemplary embodiment described with reference to FIGS. 11 and 12 includes the driving IC and the detecting IC for each of the plurality of sub-touch areas, but each of the driving IC and the detecting IC does not include a module for processing digital data (e.g., does not include the touch controller 440 and the digital processor 430 of FIG. 10). Thus, manufacturing costs may be reduced and a more efficient implementation and design may be facilitated. In addition, when touch sensors are applied to display device 10 having an aspect ratio of a screen different from that of a general TV or monitor (e.g., such as a display device 10 applied to a vehicle), ICs may be designed to correspond to a ratio of the number of channels of the touch sensors. As a result, design loss of the ICs may be reduced.

Figure 13:
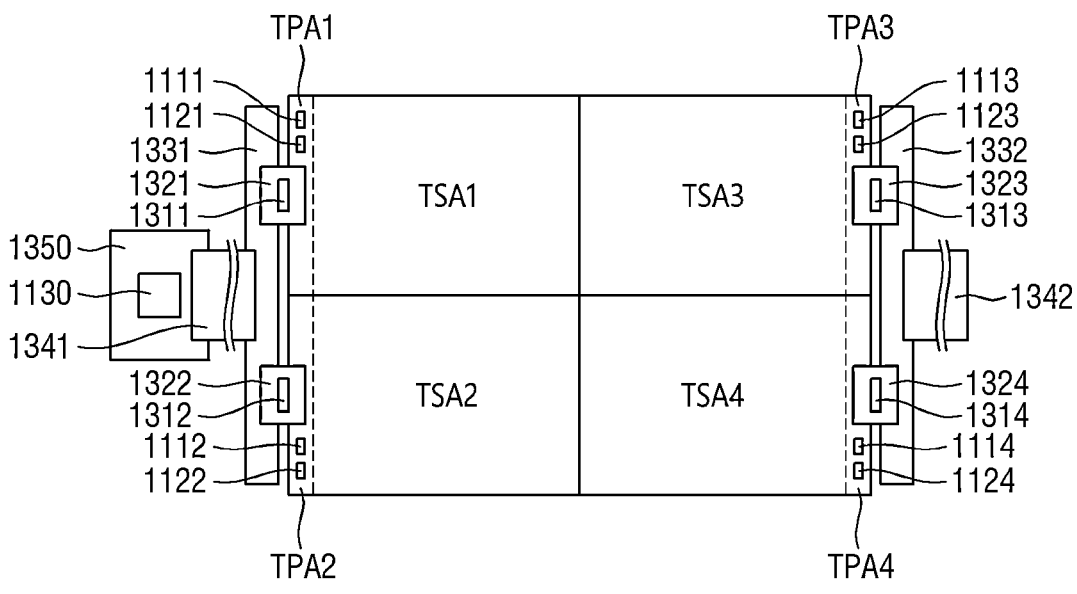
FIG. 13 is a plan view illustrating a module structure of a touch unit of the display device according to an exemplary embodiment.
Figure 14:
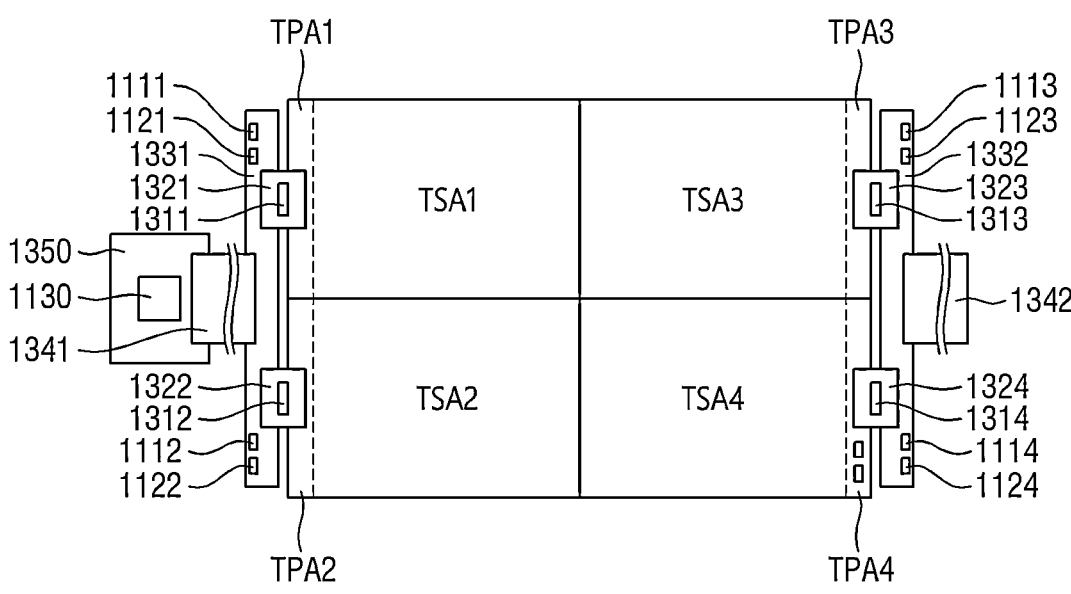
FIG. 14 is a plan view illustrating a module structure of a touch unit of a display device according to another exemplary embodiment.

FIG. 13 is a plan view illustrating a module structure of touch unit TSU of the display device 10 according to an exemplary embodiment. FIG. 14 is a plan view illustrating a module structure of a touch unit TSU of a display device 10 according to another exemplary embodiment.

Referring to FIG. 13, the touch unit TSU of the display device 10 according to an exemplary embodiment may include a touch area overlapping at least a portion of the display panel 100. According to an exemplary embodiment, the touch area TSA may be divided into a first sub-touch area TSA1, a second sub-touch area TSA2, a third sub-touch area TSA3, and a fourth sub-touch area TSA4. The first sub-touch area TSA1, the second sub-touch area TSA2, the third sub-touch area TSA3, and the fourth sub-touch area TSA4 may be disposed, for example, in a matrix form. For example, among the plurality of sub-touch areas divided in the matrix form from the touch area, the first sub-touch area TSA1 may be disposed in a first row and first column (e.g., an upper left end with respect to the center of the touch area), the second sub-touch area TSA2 may be disposed in a second row and first column (e.g., a lower left end with respect to the center of the touch area), the third sub-touch area TSA3 may be disposed in a first row and second column (e.g., an upper right end with respect to the center of the touch area), and the fourth sub-touch area TSA4 may be disposed in a second row and second column (e.g., a lower right end with respect to the center of the touch area). Areas of the first sub-touch area TSA1, the second sub-touch area TSA2, the third sub-touch area TSA3, and the fourth sub-touch area TSA4 may be substantially the same as each other, but two or more of these sub-touch areas may be different in another embodiment.

A plurality of driving ICs 1111, 1112, 1113, and 1114 and a plurality of detecting ICs 1121, 1122, 1123, and 1124 may be mounted on a substrate on which the driving electrodes TE and the detecting electrodes RE of the touch area are formed. For example, the substrate may include a touch peripheral area TPA disposed at an edge of the display panel 100. The touch peripheral area TPA is an area disposed at an edge of the touch area TSA. The plurality of driving ICs 1111, 1112, 1113, and 1114 and the plurality of detecting ICs 1121, 1122, 1123, and 1124 may be mounted in the touch peripheral area TPA. A plurality of touch driving lines electrically connecting the plurality of driving ICs 1111, 1112, 1113, and 1114 and the driving electrodes TE of the respective sub-touch areas may be formed in the touch peripheral area TPA. For example, the plurality of driving ICs 1111, 1112, 1113, and 1114 may be electrically connected to the driving electrodes TE of the respective sub-touch areas through the plurality of touch driving lines. A plurality of touch detecting lines electrically connecting the plurality of detecting ICs 1121, 1122, 1123, and 1124 and the detecting electrodes RE of the respective sub-touch areas may be formed in the touch peripheral area. For example, the plurality of detecting ICs 1121, 1122, 1123, and 1124 may be electrically connected to the detecting electrodes RE of the respective sub-touch areas through the plurality of touch detecting lines.

A processor 1130 for controlling the plurality of driving ICs 1111, 1112, 1113, and 1114 and the plurality of detecting ICs 1121, 1122, 1123, and 1124 may be implemented in the form of a touch control IC 1130. Hereinafter, the processor 1130 will be described as the touch control IC 1130. The touch control IC 1130 may be mounted on a circuit board 1350 provided separately from the substrate on which the display panel 100 and the touch unit TSU are formed. For example, the circuit board 1350 may be a main board on which a power supply unit and a main processor of the display device 10 are mounted. Such a circuit board 1350 may be electrically connected to the plurality of driving ICs 1111, 1112, 1113, and 1114 and the plurality of detecting ICs 1121, 1122, 1123, and 1124 through sub-boards 1331 and 1332.

In one embodiment, pad parts electrically connected to the plurality of driving ICs 1111, 1112, 1113, and 1114 and the plurality of detecting ICs 1121, 1122, 1123, and 1124 may be formed in at least partial edge area (e.g., a touch peripheral area) of the substrate on which the display panel 100 and the touch unit TSU are formed. The pad parts may be electrically connected to the sub-boards through first connection members (or connectors) 1321, 1322, 1323, and 1324. Accordingly, the plurality of driving ICs 1111, 1112, 1113, and 1114 and the plurality of detecting ICs 1121, 1122, 1123, and 1124 may be electrically connected to the sub-boards. According to an exemplary embodiment, the first connection members 1321, 1322, 1323, and 1324 may be implemented as a flexible circuit board 1350, but are not limited thereto. The first connection members 1321, 1322, 1323, and 1324 may include display driving ICs 1311, 1312, 1313, and 1314 for driving the display panel 100.

A first driving IC 1111 and a first detecting IC 1121 mounted in a first touch peripheral area TPA1 may be electrically connected to a first sub-board 1331 of the substrate through a first flexible circuit board 1321. The first sub-board 1331 may be a substrate disposed on one side of the substrate (e.g., the left side of the substrate) on which the display panel 100 and the touch unit TSU are formed. A first display driving IC 1311 for driving the first sub-touch area TSA1 of the display panel 100 corresponding to the first sub-touch area TSA1 may be mounted on the first flexible circuit board 1321.

A second driving IC 1112 and a second detecting IC 1122 mounted in a second touch peripheral area TPA2 may be electrically connected to the first sub-board 1331 of the substrate through a second flexible circuit board 1322. A second display driving IC 1312 for driving the second sub-touch area TSA2 of the display panel 100 corresponding to the second sub-touch area TSA2 may be mounted on the second flexible circuit board 1322.

The first sub-board 1331 may be electrically connected to the circuit board 1350 (e.g., the main board) on which the power supply unit and the main processor of the display device 10 are mounted, through a second connection member (or connector) 1341. The second connection member 1341 may be, for example, a cable member, but may not be limited thereto. For example, the first sub-board 1331 may be connected to the main board 1350 through the first cable member 1341. Because the first sub-board 1331 is electrically connected to the main substrate 1350 through the second connection member 1341, the first driving IC 1111, the second driving IC 1112, the first detecting IC 1121, and the second detecting IC 1122 may be electrically connected to the touch control IC 1130 of the main board 1350. The first connection members 1321 and 1322 and the second connection member 1341 may be bent. Accordingly, in one embodiment, the main substrate 1350 may be disposed on a rear surface of the substrate on which the display panel 100 and the touch unit TSU are formed.

A third driving IC 1113 and a third detecting IC 1123 mounted in a third touch peripheral area TPA3 may be electrically connected to a second sub-board 1332 of the substrate through a third flexible circuit board 1323. The second sub-board 1332 may be a substrate disposed on the other (e.g., opposing) side of the substrate (e.g., the right side of the substrate) on which the display panel 100 and the touch unit TSU are formed. A third display driving IC 1313 for driving the third sub-touch area TSA3 of the display panel 100 corresponding to the third sub-touch area TSA3 may be mounted on the third flexible circuit board 1323.

A fourth driving IC 1114 and a fourth detecting IC 1124 mounted in a fourth touch peripheral area TPA4 may be electrically connected to the second sub-board 1332 of the substrate through a fourth flexible circuit board 1324. A fourth display driving IC 1314 for driving the fourth sub-touch area TSA4 of the display panel 100 corresponding to the fourth sub-touch area TSA4 may be mounted on the fourth flexible circuit board 1324.

The second sub-board may be electrically connected to the main board on which the power supply unit and the main processor of the display device 10 are mounted, through another second connection member 1342. Another second connection member 1342 may be, for example, a cable member, but may not be limited thereto. For example, the second sub-board 1332 may be connected to the main board 1350 through the second cable member 1342. Because the second sub-board 1332 is electrically connected to the main substrate 1350 through another second connection member 1342, the third driving IC 1113, the fourth driving IC 1114, the third detecting IC 1123, and the fourth detecting IC 1124 may be electrically connected to the touch control IC 1130 of the main board 1350.

Referring to FIG. 14, in a module structure of a touch unit TSU of the display device 10 according to another exemplary embodiment, the plurality of driving ICs 1111, 1112, 1113, and 1114 and the plurality of detecting ICs 1121, 1122, 1123, and 1124 may be mounted on the first sub-board 1331 and the second sub-board 1332, respectively. For example, as illustrated in FIG. 14, the first driving IC 1111, the second driving IC 1112, the first detecting IC 1121, and the second detecting IC 1122 may be mounted on the first sub-board 1331. The first driving IC 1111 and the first detecting IC 1121 may be electrically connected to the first sub-touch area TSA1 through the first flexible circuit board 1321. The second driving IC 1112 and the second detecting IC 1122 may be electrically connected to the second sub-touch area through the second flexible circuit board 1322. For example, the third driving IC 1113, the fourth driving IC 1114, the third detecting IC 1123, and the fourth detecting IC 1124 may be mounted on the second sub-board 1332. The third driving IC 1113 and the third detecting IC 1123 may be electrically connected to the third sub-touch area through the third flexible circuit board 1323. The fourth driving IC 1114 and the fourth detecting IC 1124 may be electrically connected to the fourth sub-touch area TSA4 through the fourth flexible circuit board 1324.

Figure 15:
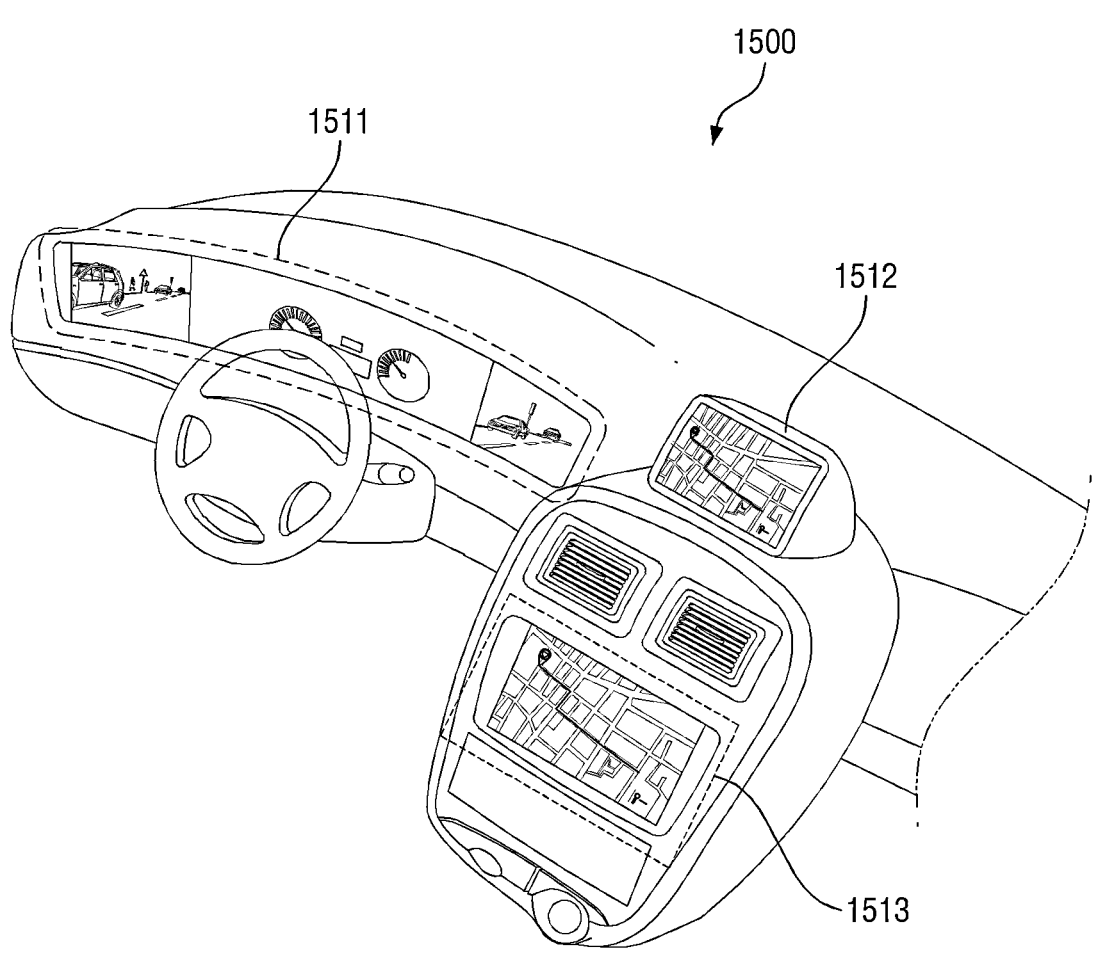
FIG. 15 is a view illustrating an example of an instrument board and a center fascia of a vehicle including the display device according to an exemplary embodiment of the present disclosure.
Figure 16:
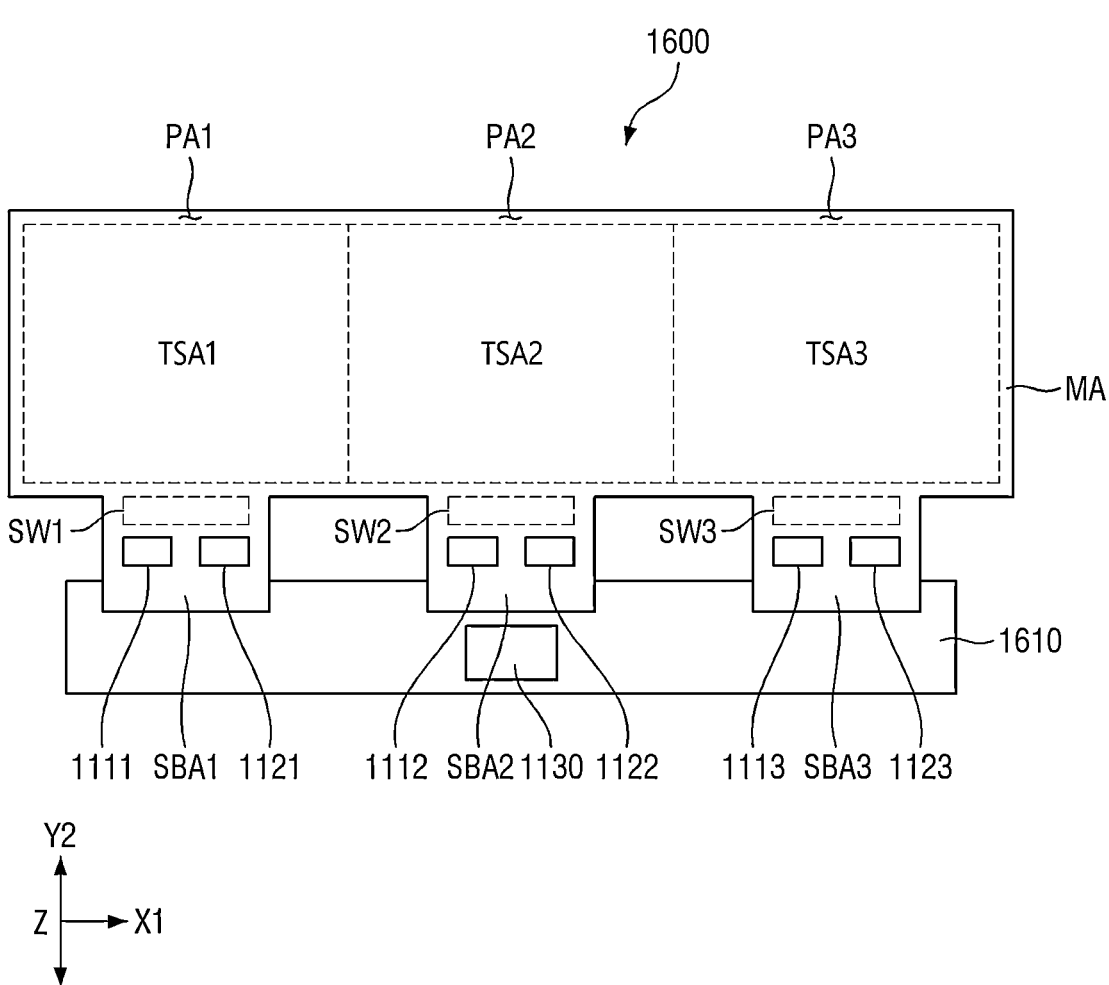
FIG. 16 is a plan view illustrating a module structure of a touch unit of the display device according to an exemplary embodiment illustrated in FIG. 15.

FIG. 15 is a view illustrating an example of an instrument board and a center fascia of a vehicle including the display device according to an exemplary embodiment of the present disclosure. FIG. 16 is a plan view illustrating a module structure of a touch unit TSU of the display device according to an exemplary embodiment illustrated in FIG. 15.

Referring to FIG. 15, the display device may be a display device 1511, 1512, or 1513 for a vehicle 1500. For example, the display device may be the display device 1511 applied to an instrument board of the vehicle 1500. In one embodiment, the display device may be a display device 1512 applied to a center fascia of the vehicle 1500. In one embodiment, the display device may be a display device 1513 applied to a center information display (CID) disposed on a dashboard of the vehicle 1500.

In an illustrated example, the display device 1511 applied to the instrument board of the vehicle 1500 may be a display device having a ratio different from that of a general TV or monitor. For example, the display device 1511 may be formed to extend from the instrument board of the vehicle 1500 to the center fascia of the vehicle 1500. Such a display device 1511 may provide a touch function, and driving ICs and detecting ICs may be designed to correspond to a ratio of the number of channels of touch sensors.

For example, as illustrated in FIG. 16, the display device 1511 applied to the instrument board of the vehicle 1500 may include a touch area, which may include a plurality of sub-touch areas disclosed in a linear pattern. For example, the touch area may include a first sub-touch area TSA1, a second sub-touch area TSA2, and a third sub-touch area TSA3 disposed to correspond to a main area MA in which the display device 1511 displays a screen. The second sub-touch area TSA2 may be disposed in a first direction (e.g., an X1 direction) from the first sub-touch area TSA1. The third sub-touch area TSA3 may be disposed in the first direction (e.g., the X1 direction) from the second sub-touch area TSA2. Accordingly, the second sub-touch area TSA2 may be disposed between the first sub-touch area TSA1 and the third sub-touch area TSA3. While three sub-touch areas are shown in the embodiment of FIG. 16, a different number of sub-touch areas may be provided in other embodiments.

In an illustrated example, areas of the first sub-touch area TSA1, the second sub-touch area TSA2, and the third sub-touch area TSA3 may all be the same as each other, but all or a portion of these areas may be different in another embodiment. For example, an area of the first sub-touch area TSA1 and an area of the second sub-touch area TSA2 may be the same as each other, and the area of the first sub-touch area TSA1 and an area of the third sub-touch area TSA3 are the same as each other. However, unlike the illustrated example, the areas of the first sub-touch area TSA1, the second sub-touch area TSA2, and the third sub-touch area TSA3 are not all the same as each other, and areas of some of the sub-touch areas may be different from areas of the others of the sub-touch areas in other embodiments.

The first sub-touch area TSA1 may be connected to a first driving IC 1111 and a first detecting IC 1121. The second sub-touch area TSA2 may be connected to a second driving IC 1112 and a second detecting IC 1122. The third sub-touch area TSA3 may be connected to a third driving IC 1113 and a third detecting IC 1123.

A plurality of driving ICs (e.g., the first driving IC 1111, the second driving IC 1112, and the third driving IC 1113) may be mounted in touch peripheral areas positioned in a second direction (e.g., a Y1 direction) perpendicular to the first direction (e.g., the X1 direction) from the first to third sub-touch areas TSA1, TSA2, and TSA3, respectively.

The first driving IC 1111 and the first detecting IC 1121 may be mounted in a first touch peripheral area TPA1 (e.g., a first sub-area SBA1) positioned in the second direction from the first sub-touch area TSA1. The first sub-touch area TSA1 may be configured to be connected to a portion of a circuit board 1610. Accordingly, the first driving IC 1111 and the first detecting IC 1121 may be electrically connected to a processor 1130 (e.g., a touch control IC 1130) mounted on the circuit board 1610.

The second driving IC 1112 and the second detecting IC 1122 may be mounted in a second touch peripheral area TPA2 (e.g., a second sub-area SBA2) positioned in the second direction from the second sub-touch area TSA2. The second sub-touch area TSA2 may be configured to be connected to another portion of the circuit board 1610. Accordingly, the second driving IC 1112 and the second detecting IC 1122 may be electrically connected to the processor 1130 (e.g., the touch control IC 1130) mounted on the circuit board 1610.

The third driving IC 1113 and the third detecting IC 1123 may be mounted in a third touch peripheral area TPA3 (e.g., a third sub-area SBA3) positioned in the second direction from the third sub-touch area TSA3. The third sub-touch area TSA3 may be configured to be connected to still another portion of the circuit board 1610. Accordingly, the third driving IC 1113 and the third detecting IC 1123 may be electrically connected to the processor 1123 (e.g., the touch control IC 1130) mounted on the circuit board 1610.

In FIG. 16, reference numerals SW1, SW2, and SW3 denote switching units (or switches) that switch electrical connections between the plurality of driving ICs 1111, 1112, and 1113 and a plurality of detecting ICs 1121, 1122, and 1123, and driving electrodes TE and detecting electrodes RE formed in a plurality of sub-touch areas TSA1, TSA2, and TSA3. A description of embodiments of the switching units SW1, SW2, and SW3 will be described with reference to FIGS. 18 to 21.

In FIG. 16, reference numerals PA1, PA2, and PA3 denote peripheral areas disposed at edges or peripheral portions of the plurality of sub-touch areas TSA1, TSA2, and TSA3, respectively. Some switching elements of the switching units SW1, SW2, and SW3 may be disposed in the peripheral areas PA1, PA2, and PA3, and a description of embodiments thereof will be provided with reference to FIG. 21.

Figure 17:
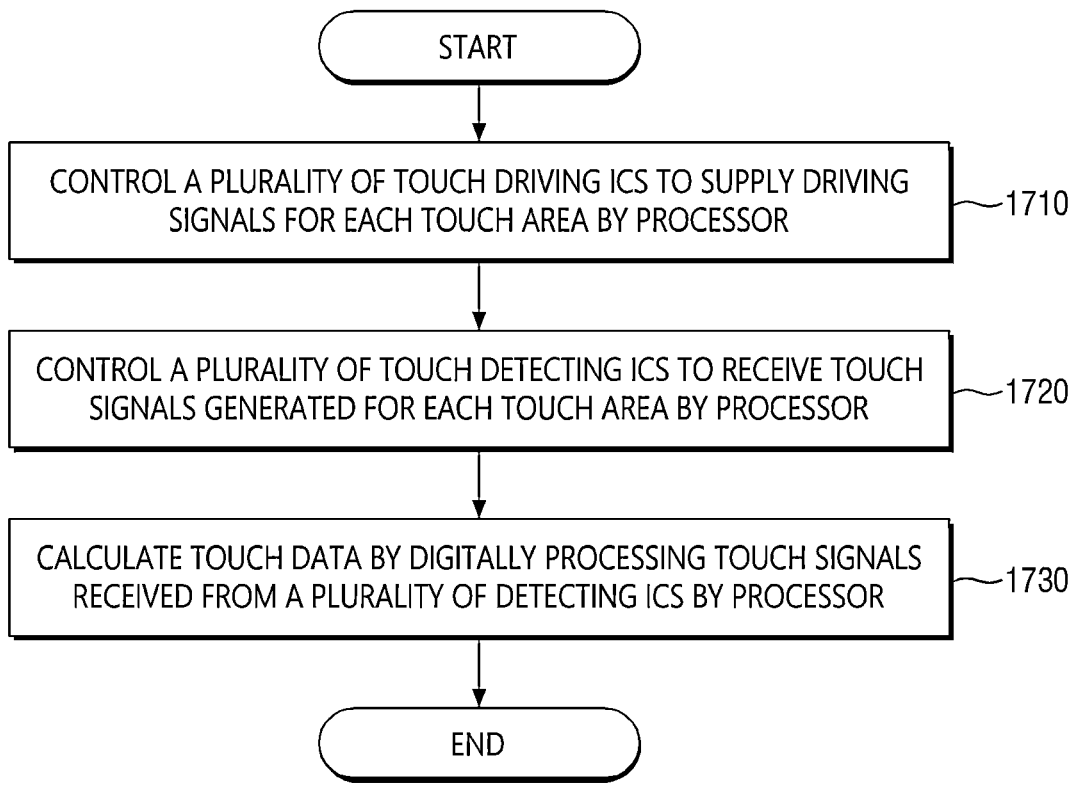
FIG. 17 is a flowchart illustrating a method of driving the display device according to an exemplary embodiment.

FIG. 17 is a flowchart illustrating a method of driving the display device 10 according to an exemplary embodiment. The display device 10 may correspond to any one of the foreging embodiments, including but not limited to the embodiment of FIG. 11. In some embodiments, one or more of the operations illustrated in FIG. 17 may be omitted. Before or after at least some operations illustrated in FIG. 17, at least some operations mentioned with reference to other drawings in the present disclosure may be additionally performed. Hereinafter, a method of driving the display device 10 according to an exemplary embodiment will be described with reference to FIG. 17.

In operation 1710, in the display device 10 according to an exemplary embodiment, the processor 1130 (e.g., the touch control IC 1130) may control the plurality of driving ICs 1111, 1112, 1113, and 1114 to supply driving signals for each touch area. The plurality of driving ICs 1111, 1112, 1113, and 1114 may be provided to correspond to the plurality of sub-touch areas TSA1, TSA2, TSA3, and TSA4, respectively, e.g., in a one-to-one manner. The plurality of driving ICs 1111, 1112, 1113, and 1114 may supply the driving signals to the driving electrodes TE of the corresponding sub-touch areas, respectively, based on the control of the processor 1130.

In operation 1720, in the display device 10 according to an exemplary embodiment, the processor 1130 may control the plurality of detecting ICs 1121, 1122, 1123, and 1124 to receive touch signals generated for each corresponding touch area. The processor 1130 may receive the touch signals (which are analog signals) from the plurality of detecting ICs 1121, 1122, 1123, and 1124.

For example, the first detecting IC 1121 may be connected to the plurality of detecting electrodes RE formed in the first sub-touch area TSA1 through touch detecting lines RL. The first detecting IC 1121 may sense change amounts in mutual capacitance between the plurality of driving electrodes TE and the plurality of detecting electrodes RE through the touch detecting lines RL. For example, the first detecting IC 1121 may include an integrating circuit including at least one operational amplifier for detecting a change in capacitance from the detecting electrode RE of the touch unit TSU and a capacitor having a predetermined capacitance. An inverting input terminal of the operational amplifier may be connected to the detecting electrode RE to output the change in capacitance as an analog signal.

For example, the first detecting IC 1121 may include a capacitor, a switch, a resistor, an amplifier, and a sample-and-hold circuit, but the first detecting IC 1121 may have a different circuit configuration in another embodiment. For example, a voltage corresponding to electric charges charged in the capacitor may be sampled and then held for a predetermined period by the sample-and-hold circuit.

As another example, the first driving IC 1111 may supply the touch driving signals to the plurality of driving electrodes TE formed in the first sub-touch area TSA1. The first detecting IC 1121 may supply the touch driving signals to the plurality of detecting electrodes RE formed in the first sub-touch area TSA1. In this case, the first driving IC 1111 may sense change amounts in electric charges of the plurality of driving electrodes TE, and the first detecting IC 1121 may sense change amounts in electric charges of the plurality of detecting electrodes RE. Accordingly, each of the first driving IC 1111 and the first detecting IC 1121 may sense change amounts in self-capacitance formed in the plurality of driving electrodes TE and the plurality of detecting electrodes RE.

The first detecting IC 1121 may receive the touch signals RX through the touch detecting lines RL formed in the first sub-touch area TSA1. The touch signal RX may be an analog signal having a plurality of driving pulses. For example, the touch signal RX may be a sine wave, a pulse wave, or a ramp wave having any frequency (or cycle), but the touch signal RX may have a different waveform in another embodiment. The first detecting IC 1121 may transmit the touch signal RX including the analog signal to the processor 1130 as a touch signal RX regarding the first sub-touch area TSA1.

In operation 1730, in the display device 10 according to an exemplary embodiment, the processor 1130 may calculate touch data by digitally processing the touch signals received from the plurality of detecting ICs 1121, 1122, 1123, and 1124. The processor 1130 may convert the touch signal RX including the analog signal into touch sensing data, which is digital data. When a detected voltage of the touch signal RX input from the first detecting IC 1121 is greater than a predetermined value, the processor 1130 may determine that a touch input has occurred. The processor 1130 may generate touch identification data TSD corresponding to each of the plurality of sub-touch areas based on the touch sensing data. The processor 1130 may calculate touch data by combining touch identification data TSD corresponding to each of the plurality of sub-touch areas with each other.

Figure 18:
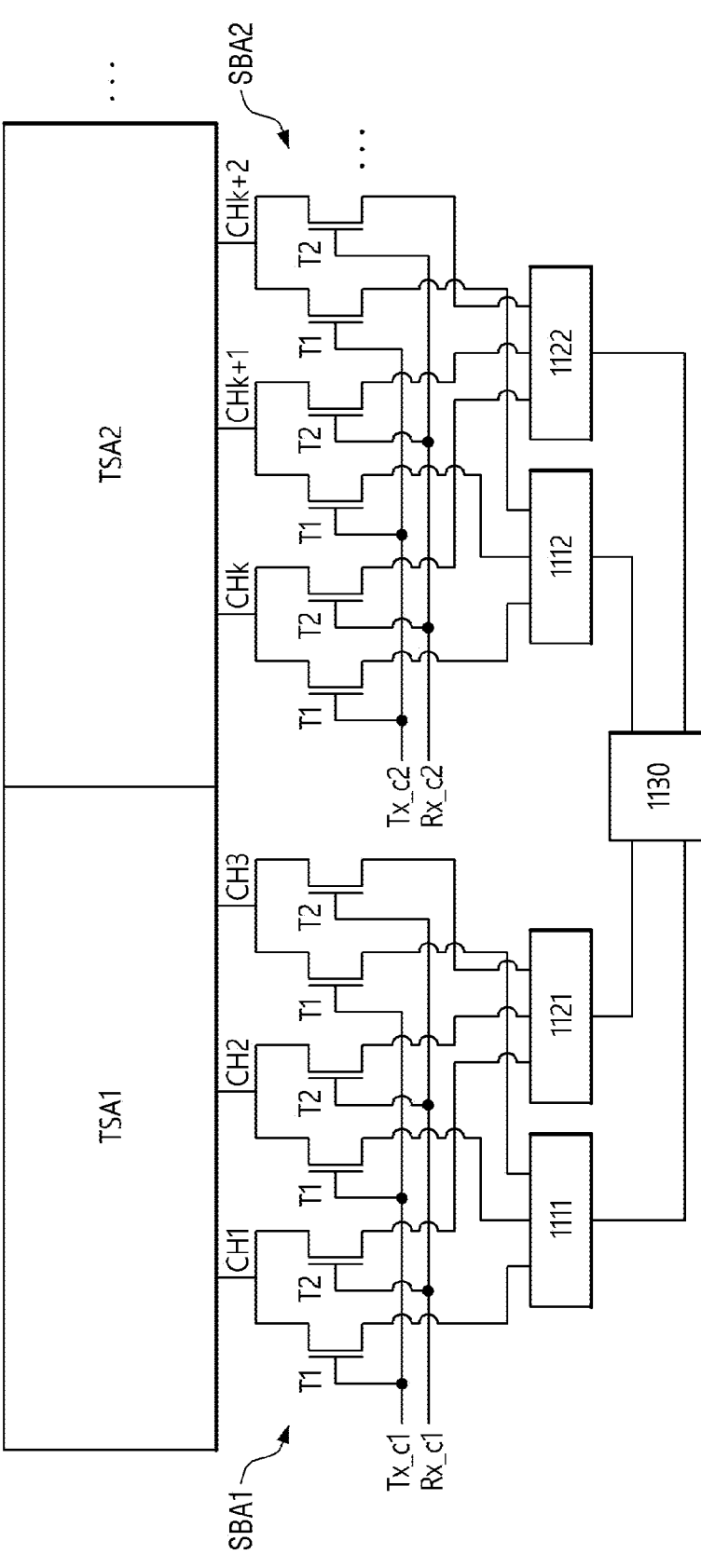
FIG. 18 is a configuration diagram of a switching unit according to an exemplary embodiment illustrated in FIG. 16.
Figure 19:
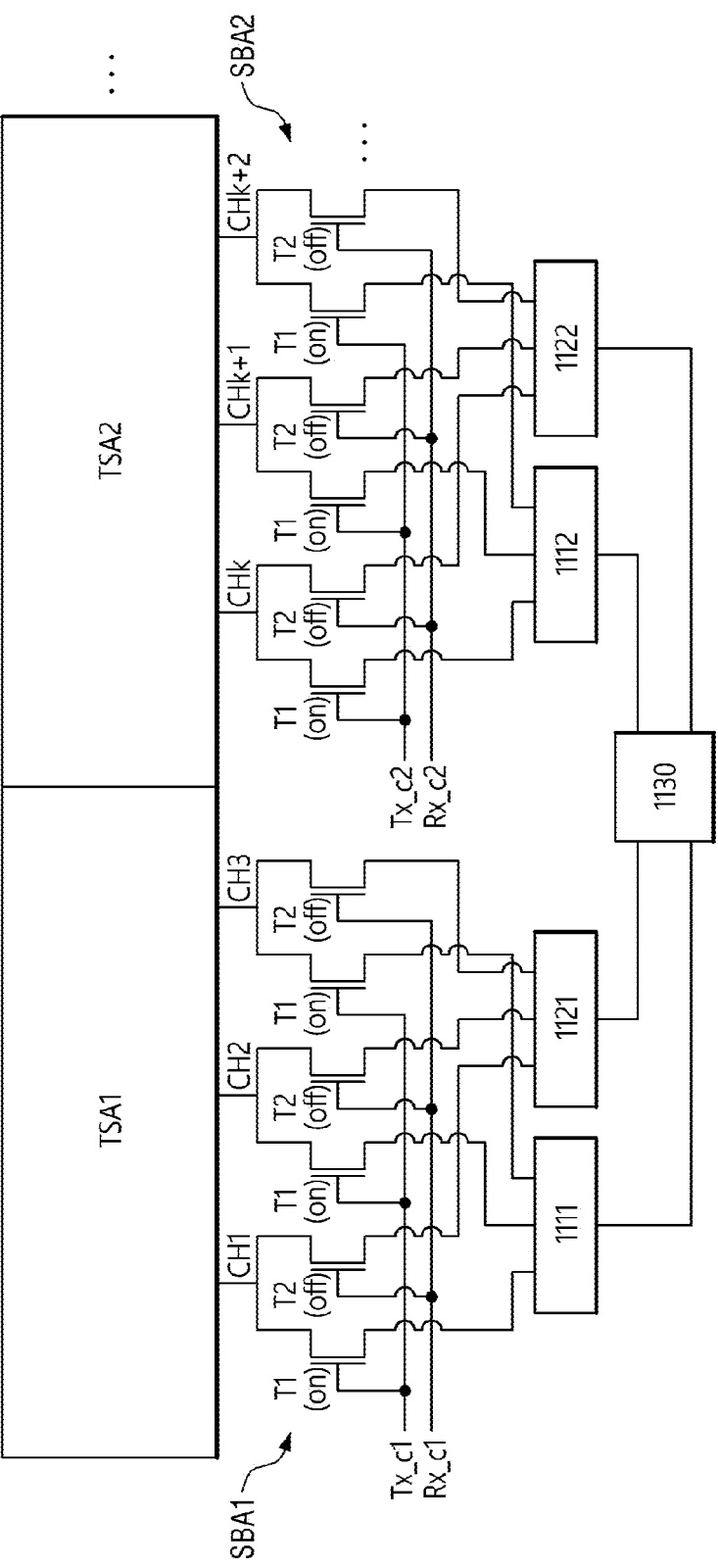
FIG. 19 is a conceptual diagram for describing an operation of the switching unit according to an exemplary embodiment according to a first period.
Figure 20:
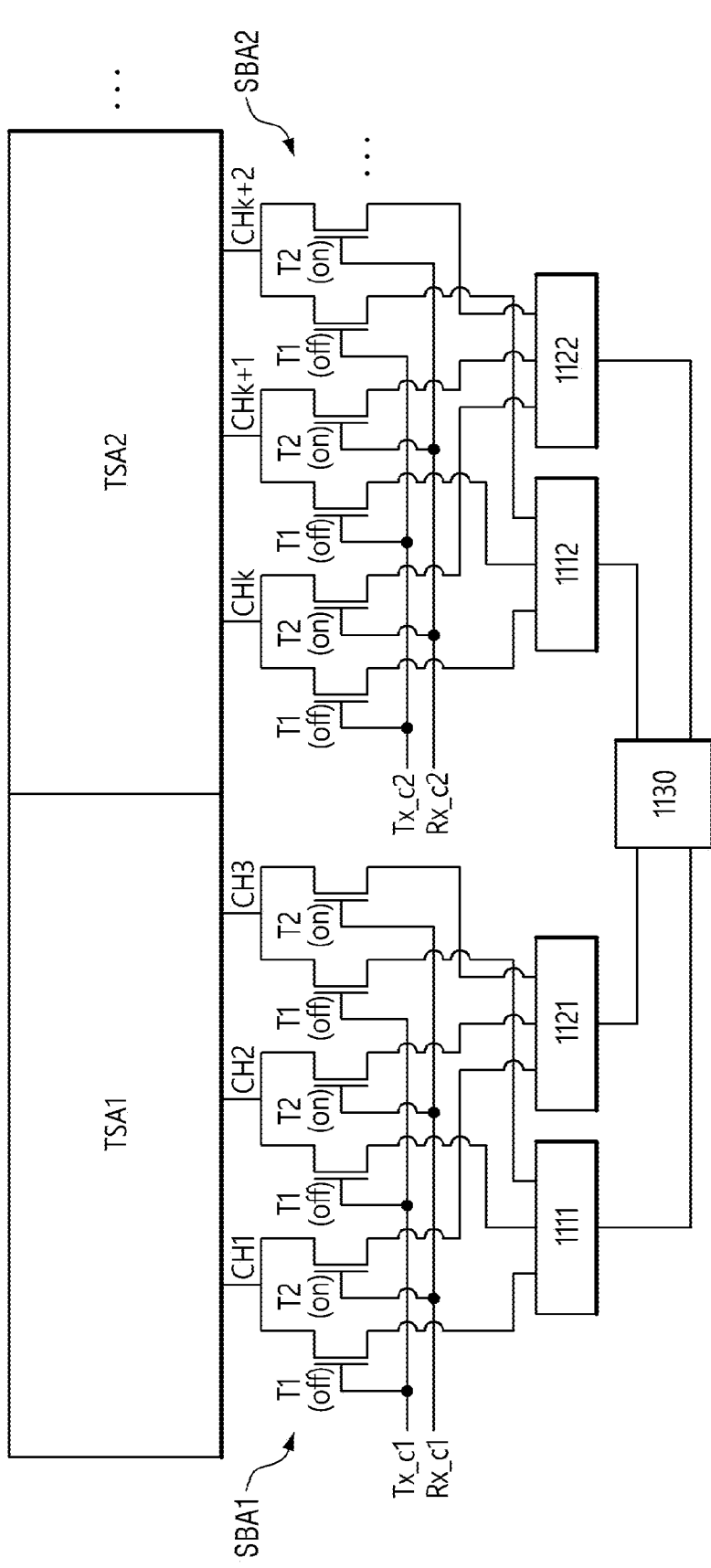
FIG. 20 is a conceptual diagram for describing an operation of the switching unit according to an exemplary embodiment according to a second period.
Figure 21:
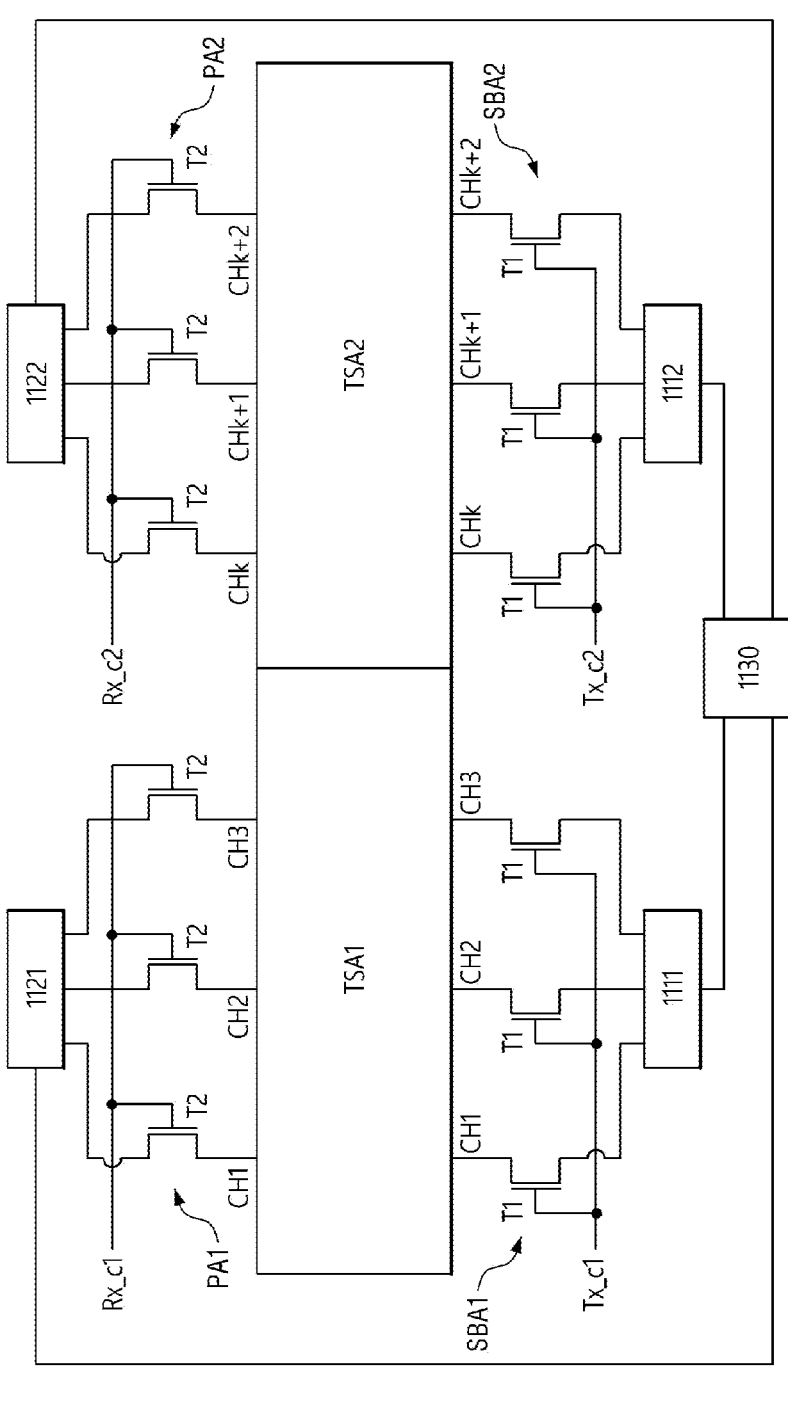
FIG. 21 is a configuration diagram of a switching unit according to another exemplary embodiment.

FIG. 18 is a configuration diagram of a switching unit (or circuit) according to an exemplary embodiment illustrated in FIG. 16. FIG. 19 is a conceptual diagram for describing an operation of the switching unit according to an exemplary embodiment according to a first period. FIG. 20 is a conceptual diagram for describing an operation of the switching unit according to an exemplary embodiment according to a second period. FIG. 21 is a configuration diagram of a switching unit according to another exemplary embodiment.

Referring to FIG. 18, in the display device 10 according to an exemplary embodiment, a plurality of driving ICs 1111, 1112, and 1113 may be configured to sense change amounts of self-capacitance formed in the driving electrodes TE of the touch area. The plurality of detecting ICs 1121, 1122, and 1123 may be configured to sense change amounts in self-capacitance formed in the detecting electrodes of the touch area. In this case, the substrate on which the display panel 100 and the touch sensors are formed may include switching units (e.g., switches SW1, SW2, and SW3 of FIG. 16) that operate to switch electrical connections between the plurality of driving ICs 1111, 1112, and 1113 and the plurality of detecting ICs 1121, 1122, and 1123, and driving electrodes TE and the detecting electrodes RE formed in the plurality of sub-touch areas TSA1, TSA2, and TSA3.

The switching units SW1, SW2, and SW3 may include a first switching unit SW1 disposed between the first driving IC 1111 and the first detecting IC 1121, and the first sub-touch area TSA1, a second switching unit SW2 disposed between the second driving IC 1112 and the second detecting IC 1122, and the second sub-touch area TSA2, and a third switching unit SW3 disposed between the third driving IC 1113 and the third detecting IC 1123, and the third sub-touch area TSA3. The first switching unit SW1, the second switching unit SW2, and the third switching unit SW3 may include substantially the same components. Accordingly, hereinafter, for convenience of explanation, only components of the first switching unit SW1 will be described.

The first switching unit SW1 may include a plurality of first switching elements (or switches) T1 for switching electrical connections between a plurality of channels CH1, CH2, CH3, CHk, CHk+1, and CHk+2 connected to the driving electrodes TE or the detecting electrodes RE formed in the first sub-touch area TSA1 and the first driving IC 1111. The first switching elements T1 may be implemented as thin film transistors (TFTs), but may be implemented by other types of circuits in other embodiments. The first switching elements T1 may be turned on in response to activation of first control signals Tx_c1 and Tx_c2, and may electrically connect the plurality of channels CH1, CH2, CH3, CHk, CHk+1, and CHk+2 connected to the driving electrodes TE or the detecting electrodes RE formed in the first sub-touch area TSA1 to the first driving IC 1111 when they are turned on. The first control signals Tx_c1 and Tx_c2 may be signals output by the processor 1130. In an illustrated example, a first channel CH1, a second channel CH2, and a third channel CH3 have been illustrated as examples of the channels connected to the first sub-touch area TSA1, but the number of channels connected to the first sub-touch area TSA1 may correspond to the number of driving electrodes TE and the number of detecting electrodes RE in other embodiments. Likewise, channels connected to the second sub-touch area TSA2 are not limited to CHk, CHk+1, and CHk+2 in the illustrated example.

The first switching unit SW1 may further include a plurality of second switching elements (or switches) T2 switching electrical connections between the plurality of channels CH1, CH2, CH3, CHk, CHk+1, and CHk+2 connected to the driving electrodes TE or the detecting electrodes RE formed in the first sub-touch area TSA1 and the first detecting IC 1121. The second switching elements T2 may be implemented as TFTs, but may be implemented by other types of circuits in other embodiments. The second switching elements T2 may be turned on in response to activation of second control signals Rx_c1 and Rx_c2, and may electrically connect the plurality of channels CH1, CH2, CH3, CHk, CHk+1, and CHk+2 connected to the driving electrodes TE or the detecting electrodes RE formed in the first sub-touch area TSA1 to the first detecting IC 1121 when they are turned on. The second control signals Rx_c1 and Rx_c2 may be signals output by the processor 1130.

The processor 1130 may activate the first control signals Tx_c1 and Tx_c2 and the second control signals Rx_c1 and Rx_c2 alternately. For example, the processor 1130 may activate the first control signals Tx_c1 and Tx_c2 and deactivate the second control signals Rx_c1 and Rx_c2 during a first period. The processor 1130 may activate the second control signals Rx_c1 and Rx_c and deactivate the first control signals Tx_c1 and Tx_c2 during a second subsequent period.

Referring to FIG. 19, the processor 1130 may activate the first control signals Tx_c1 and Tx_c2 and deactivate the second control signals Rx_c1 and Rx_c2 during the first period. Accordingly, during the first period of the switching units SW1, SW2, and SW3, the first switching elements T1 may be turned on and the second switching elements T2 may be turned off. During the first period of the switching units SW1, SW2, and SW3, the plurality of driving ICs 1111, 1112, and 1113 and the plurality of channels CH1, CH2, CH3, CHk, CHk+1, and CHk+2 connected to the driving electrodes TE or the detecting electrodes RE may be electrically connected to each other through the turned-on first switching elements T1. During the first period of the switching units, the plurality of driving ICs 1111, 1112, and 1113 may supply the touch driving signals to all or at least some (e.g., odd-numbered channels) of the plurality of channels CH1, CH2, CH3, CHk, CHk+1, and CHk+2, and sense change amounts in self-capacitance formed in the plurality of driving electrodes TE and the plurality of detecting electrodes RE through the corresponding channels.

Referring to FIG. 20, the processor 1130 may activate the second control signals Rx_c1 and Rx_c2 and deactivate the first control signals Tx_c1 and Tx_c2 during the second period. Accordingly, during the second period of the switching units SW1, SW2, and SW3, the second switching elements T2 may be turned on and the first switching elements T1 may be turned off. During the second period of the switching units SW1, SW2, and SW3, the plurality of detecting ICs 1121, 1122, and 1123 and the plurality of channels CH1, CH2, CH3, CHk, CHk+1, and CHk+2 connected to the driving electrodes TE or the detecting electrodes RE may be electrically connected to each other through the turned-on second switching elements T2. During the second period of the switching units SW1, SW2, and SW3, the plurality of detecting ICs 1121, 1122, and 1123 may supply the touch driving signals to all or at least some (e.g., even-numbered channels) of the plurality of channels CH1, CH2, CH3, CHk, CHk+1, and CHk+2, and sense change amounts in self-capacitance formed in the plurality of driving electrodes TE and the plurality of detecting electrodes RE through the corresponding channels.

According to another exemplary embodiment, as illustrated in FIG. 21, at least some of the switching elements constituting the switching units SW1, SW2, and SW3 may be disposed on another (e.g., an opposing) side of the sub-touch areas TSA1, TSA2, and TSA3 (e.g., in a direction above the sub-touch areas on a plane viewed from above) rather than only on one side of the sub-touch areas TSA1, TSA2, and TSA3 (e.g., in a direction below the sub-touch areas on a plane viewed from above). For example, the first sub-touch area TSA1, the second sub-touch area TSA2, and the third sub-touch area TSA3 may be disposed to be adjacent to each other in the first direction (e.g., the X1 direction of FIG. 16), and the plurality of driving ICs 1111, 1112, and 1113 and the plurality of detecting ICs 1121, 1122, and 1123 may be mounted in the sub-touch areas (e.g., the touch peripheral areas) positioned in the second direction (e.g., the Y1 direction of FIG. 16) perpendicular to the first direction (e.g., the X1 direction).

In addition, the first switching elements T1 of the switching elements constituting the switching units SW1, SW2, and SW3 may be positioned in the second direction (e.g., the Y1 direction) from the plurality of sub-touch areas TSA1, TSA2, and TSA3, and may be disposed between the plurality of sub-touch areas TSA1, TSA2, and TSA3 and the plurality of driving ICs 1111, 1112, and 1113. The second switching elements T2 of the switching elements constituting the switching units SW1, SW2, and SW3 may be positioned in a third direction (e.g., a Y2 direction of FIG. 16) opposite to the second direction (e.g., the Y1 direction) from the plurality of sub-touch areas TSA1, TSA2, and TSA3, and may be disposed between the plurality of sub-touch areas TSA1, TSA2, and TSA3 and the plurality of detecting ICs 1121, 1122, and 1123. In this case, the plurality of detecting ICs 1121, 1122, and 1123 may be mounted in peripheral areas positioned in the third direction (e.g., the Y2 direction of FIG. 16) from the plurality of sub-touch areas TSA1, TSA2, and TSA3.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, units, circuits, drivers, and other signal generating and signal processing features of the embodiments disclosed herein may be implemented, for example, in non-transitory logic that may include hardware, software, or both. When implemented at least partially in hardware, the controllers, processors, devices, units, circuits, drivers and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, units, circuits, drivers and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The embodiments may be combined to form additional embodiments.

What is claimed is:

1. A display device, comprising:
a plurality of detecting integrated circuits (ICs) coupled to a respective plurality of sub-touch areas; and
a processor configured to determine that a touch input has occurred on one of the sub-touch areas, wherein:
each of the plurality of detecting ICs is configured to output an analog touch signal generated by a first electrode of a corresponding one of the sub-touch areas,
the display device further includes a plurality of driving ICs, each of the plurality of driving ICs configured to drive a second electrode in a respective one of the sub-touch areas, and
the processor is configured to:
convert the analog touch signal generated from each of the sub-touch areas to digital touch sensing data,
determine that touch input has occurred based on the digital touch sensing data, and
control driving timings of the plurality of driving ICs and synchronization of the plurality of driving ICs and the plurality of detecting ICs.

2. The display device of claim 1, wherein the processor is configured to:
generate touch identification data from the digital touch sensing data generated for each of the sub-touch areas,
calculate touch data based on a combination of the touch identification data generated for the plurality of sub-touch areas, and
determine that touch input has occurred based on the touch data.

3. An electronic device, comprising:
a display device, comprising:
a plurality of detecting integrated circuits (ICs) coupled to a respective plurality of sub-touch areas; and
a processor configured to determine that a touch input has occurred on one of the sub-touch areas, wherein:
each of the plurality of detecting ICs is configured to output an analog touch signal generated by a first electrode of a corresponding one of the sub-touch areas,
the display device further includes a plurality of driving ICs, each of the plurality of driving ICs configured to drive a second electrode in a respective one of the sub-touch areas, and
the processor is configured to:

convert the analog touch signal generated from each of the sub-touch areas to digital touch sensing data, determine that touch input has occurred based on the digital touch sensing data, and control driving timings of the plurality of driving ICs and synchronization of the plurality of driving ICs and the plurality of detecting ICs.

5

\* \* \* \* \*